United States Patent
Wiley et al.

(10) Patent No.: US 11,010,972 B2
(45) Date of Patent: May 18, 2021

(54) CONTEXT SENSITIVE USER INTERFACE ACTIVATION IN AN AUGMENTED AND/OR VIRTUAL REALITY ENVIRONMENT

(71) Applicant: Google Inc., Mountain View, CA (US)

(72) Inventors: Jon Wiley, San Jose, CA (US); Manuel Christian Clement, Felton, CA (US)

(73) Assignee: Google LLC, Mountain View, CA (US)

( * ) Notice: Subject to any disclaimer, the term of this patent is extended or adjusted under 35 U.S.C. 154(b) by 47 days.

(21) Appl. No.: 15/371,886

(22) Filed: Dec. 7, 2016

(65) Prior Publication Data

US 2017/0169616 A1  Jun. 15, 2017

Related U.S. Application Data

(60) Provisional application No. 62/266,449, filed on Dec. 11, 2015.

(51) Int. Cl.
*G06F 3/00* (2006.01)
*G06T 19/00* (2011.01)
*G06F 3/01* (2006.01)
*G06F 3/0481* (2013.01)
*G06F 3/0484* (2013.01)

(52) U.S. Cl.
CPC ............ *G06T 19/006* (2013.01); *G06F 3/011* (2013.01); *G06F 3/017* (2013.01); *G06F 3/04815* (2013.01); *G06F 3/04842* (2013.01)

(58) Field of Classification Search
CPC combination set(s) only.
See application file for complete search history.

(56) References Cited

U.S. PATENT DOCUMENTS

| 6,031,519 | A  | * | 2/2000 | O'Brien | ............... | G03H 1/0005 345/156 |
| 7,036,082 | B1 | * | 4/2006 | Dalrymple | ............... | G06F 3/011 370/352 |
| 8,166,421 | B2 |   | 4/2012 | Magal et al. | | |

(Continued)

FOREIGN PATENT DOCUMENTS

| CN | 103760973 A | 4/2014 |
| CN | 104656890 A | 5/2015 |

OTHER PUBLICATIONS

International Search Report and Written Opinion for PCT Application No. PCT/US2016/065528, dated Apr. 3, 2017, 10 pages.

(Continued)

*Primary Examiner* — Temesghen Ghebretinsae
*Assistant Examiner* — Sosina Abebe
(74) *Attorney, Agent, or Firm* — Brake Hughes Bellermann LLP

(57) ABSTRACT

In a system for determining intent of a detected virtual contact between a user and a virtual object in a virtual reality environment, contact maybe detected between a designated selection device, manipulated by the user, and the virtual object. It may then be determined whether or not the detected contact between the designated selection device and the virtual object is intention. Determination of whether or not the detected contact is intentional may be based on at least one of an approach direction of the virtual contact with the virtual object, an approach velocity of the virtual contact with the virtual object, or an approach acceleration of the virtual contact with the virtual object.

20 Claims, 17 Drawing Sheets

(56) References Cited

U.S. PATENT DOCUMENTS

| | | | |
|---|---|---|---|
| 8,559,676 B2 | 10/2013 | Hildreth et al. | |
| 2002/0140633 A1 | 10/2002 | Rafii et al. | |
| 2008/0150899 A1 | 6/2008 | Lin et al. | |
| 2008/0252595 A1* | 10/2008 | Boillot | G06F 3/011 345/156 |
| 2009/0158151 A1* | 6/2009 | Cheng | G06F 3/0482 715/706 |
| 2009/0158222 A1* | 6/2009 | Kerr | G06F 3/016 715/867 |
| 2009/0217211 A1* | 8/2009 | Hildreth | G06F 3/017 715/863 |
| 2011/0163944 A1 | 7/2011 | Bilbrey et al. | |
| 2011/0227947 A1 | 9/2011 | Benko et al. | |
| 2011/0289456 A1* | 11/2011 | Reville | G06F 3/011 715/830 |
| 2012/0066306 A1* | 3/2012 | Leacock | H04L 51/043 709/204 |
| 2012/0235899 A1 | 9/2012 | Han et al. | |
| 2013/0016042 A1* | 1/2013 | Makinen | G06F 3/016 345/168 |
| 2013/0246861 A1* | 9/2013 | Colley | G06F 3/0488 714/48 |
| 2013/0286004 A1* | 10/2013 | McCulloch | G06T 19/006 345/419 |
| 2013/0342564 A1* | 12/2013 | Kinnebrew | G09G 3/003 345/619 |
| 2014/0152558 A1* | 6/2014 | Salter | G06F 3/013 345/157 |
| 2014/0201674 A1* | 7/2014 | Holz | G06F 3/04815 715/782 |
| 2014/0364209 A1* | 12/2014 | Perry | A63F 13/10 463/31 |
| 2016/0078679 A1* | 3/2016 | Maximo | G06F 3/0484 345/633 |
| 2016/0085403 A1* | 3/2016 | Koga | G06F 3/0485 345/684 |
| 2016/0217614 A1* | 7/2016 | Kraver | G06F 3/005 |
| 2017/0277355 A1* | 9/2017 | Kang | G06F 3/0416 |

OTHER PUBLICATIONS

First Office Action with English translation for Chinese Application No. 201680053552.6, dated Aug. 4, 2020, 39 pages.

* cited by examiner

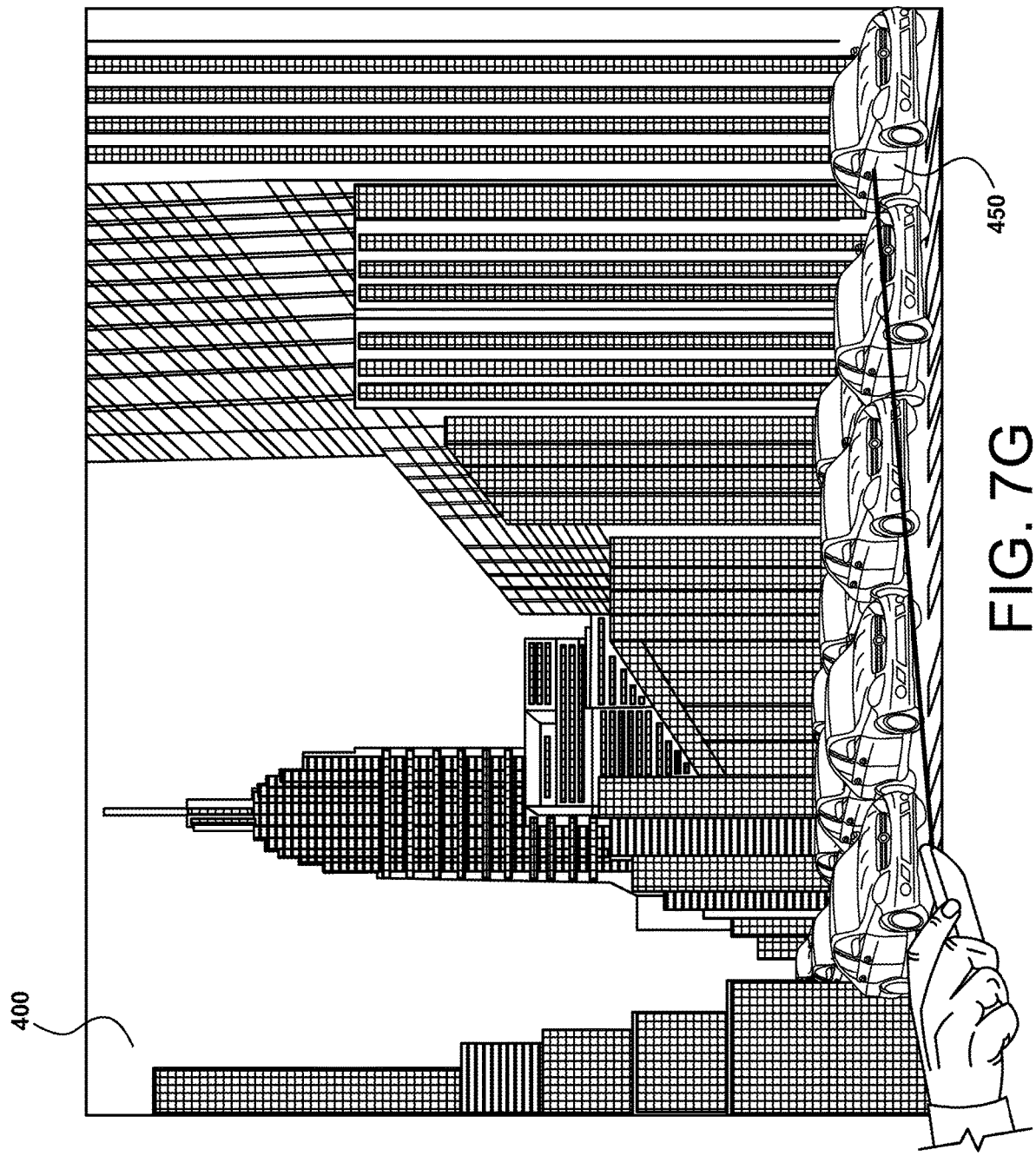

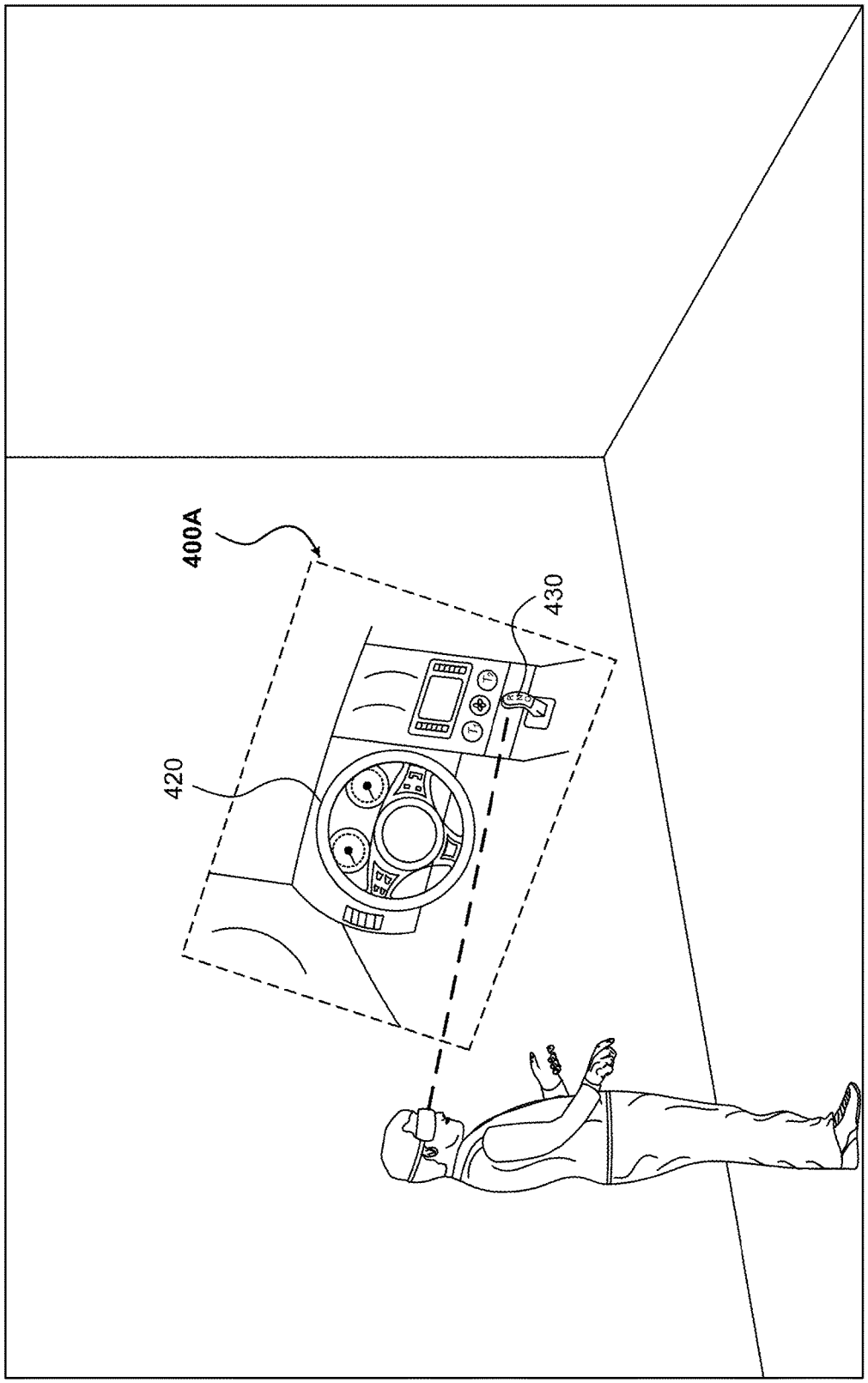

CONTEXT SENSITIVE USER INTERFACE ACTIVATION IN AN AUGMENTED AND/OR VIRTUAL REALITY ENVIRONMENT

CROSS-REFERENCE TO RELATED APPLICATIONS

This application is a Non-provisional of, and claims priority to, U.S. Patent Application No. 62/266,449, filed on Dec. 11, 2015, entitled "CONTEXT SENSITIVE USER INTERFACE ACTIVATION IN VIRTUAL REALITY", which is incorporated by reference herein in its entirety.

FIELD

This document relates, generally, to the processing of inputs in an immersive virtual reality system.

BACKGROUND

An augmented reality (AR) system and/or a virtual reality (VR) system may generate a three-dimensional (3D) immersive virtual environment. A user may experience this 3D virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the virtual environment, user interaction with the virtual environment may take various forms, such as, for example, eye gaze, head gaze, physical movement and/or manipulation of an electronic device to interact with, personalize and control the virtual environment.

SUMMARY

In one aspect, a method may include generating a virtual environment including displaying a plurality of virtual objects in the virtual environment, detecting a virtual contact between a selection device and a virtual object of the plurality of virtual objects, determining whether the detected virtual contact corresponds to a command to be executed in the virtual environment based on at least one characteristic of the detected virtual contact, and when it is determined that the detected virtual contact corresponds to a command to be executed in the virtual environment, selecting the virtual object for actuation, and executing an action in the virtual environment corresponding to the selected virtual object and the command based on the detected virtual contact.

In another aspect, a system may include a computing device configured to generate a virtual environment. The computing device may include a memory storing executable instructions, and a processor configured to execute the instructions. Execution of the instructions may cause the computing device to generate a virtual environment including a display of a plurality of virtual objects, detect a virtual contact between a selection device and a virtual object of the plurality of virtual objects, determine whether the detected virtual contact corresponds to a command to be executed in the virtual environment based on at least one characteristic of the detected virtual contact, and when it is determined that the detected virtual contact corresponds to a command to be executed in the virtual environment, select the virtual object for actuation, and execute an action in the virtual environment corresponding to the command and the selected virtual object.

The details of one or more implementations are set forth in the accompanying drawings and the description below. Other features will be apparent from the description and drawings, and from the claims.

BRIEF DESCRIPTION OF THE DRAWINGS

FIGS. 7A-7J are third person views illustrating user interaction with one or more virtual objects in an augmented and/or virtual reality environment, in accordance with implementations as described herein.

DETAILED DESCRIPTION

A user immersed in a an augmented reality and/or a virtual reality environment wearing, for example, a head mounted display (HMD) device may explore the virtual environment and interact with virtual objects, virtual elements, virtual features and the like in the virtual environment through various different types of inputs. These inputs may include, for example, physical interaction including, for example, hand/arm gestures, including virtual contact between the virtual objects and various body parts of the real user, head movement and/or head and/or eye directional gaze and the like, and/or manipulation of an electronic device separate from the HMD such as, for example, virtual contact between the electronic device and the virtual object, a virtual ray or a virtual beam emitted by the electronic device and/or the HMD, a movement of the electronic device and/or the HMD, a touch applied on a touch sensitive surface of the electronic device and/or the HMD, and the like. A virtual contact may refer to a contact in the virtual environment between a virtual object and a virtual counterpart of the real user, a body part of the real user, or the selection device in the real world, with the virtual counterpart reflecting corresponding user movement, directional gaze, and the like of the user, body part, and/or manipulation of the electronic device in the real world. The virtual counterpart of the user may be displayed in the virtual environment as an immersed user. A user may implement one or more of these different types of interactions to select a virtual object and/or a particular action in the virtual environment. A system and method, in accordance with implementations described herein, may facilitate accurate interpretation of a detected virtual contact and determination of whether or not the detected virtual contact corresponds to a user command to be executed in the virtual environment, in a user selection of a particular virtual object and/or execution of a particular action in the virtual environment, thus enhancing the user's immersive virtual experience.

Figure 1:
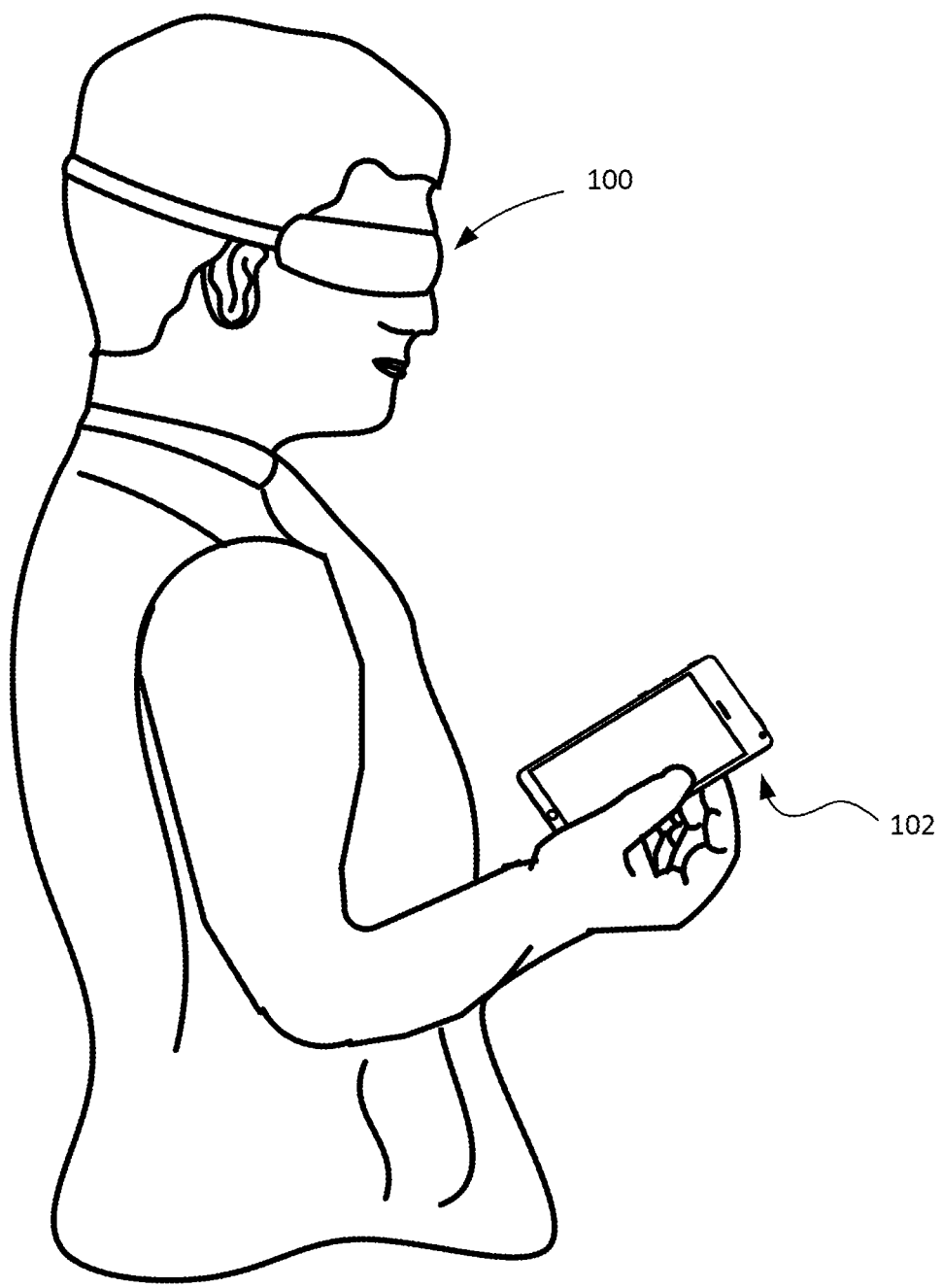
FIG. 1 is an example implementation of an augmented and/or virtual reality system including a head mounted display device and a handheld electronic device, in accordance with implementations as described herein.

In the example implementation shown in FIG. 1, a user wearing an HMD 100 is holding a portable handheld electronic device 102 in his hand. The handheld electronic device 102 may be, for example, a controller, a smartphone, or another portable handheld electronic device(s) that may be paired with, and communicate with, the HMD 100 for interaction in the virtual environment generated by the HMD 100 and displayed to the user, for example, on a display of the HMD 100. The handheld electronic device 102 may be operably coupled with, or paired with the HMD 100 via, for example, a wired connection, or a wireless connection such as, for example, a WiFi or Bluetooth connection. This pairing, or operable coupling, of the handheld electronic device 102 and the HMD 100 may provide for communication between the handheld electronic device 102 and the HMD 100 and the exchange of data between the handheld electronic device 102 and the HMD 100, so that the handheld electronic device 102 may function as a controller in communication with the HMD 100 for interacting in the immersive virtual environment generated by the HMD 100. That is, a manipulation of the handheld electronic device 102, such as, for example, a beam or ray emitted by the handheld electronic device 102 and directed to a virtual object for selection, and/or an input received on a touch surface of the handheld electronic device 102, or a movement of the handheld electronic device 102, may be translated into a corresponding selection, or movement, or other type of interaction in the immersive virtual environment generated by the HMD 100.

Figure 2A:
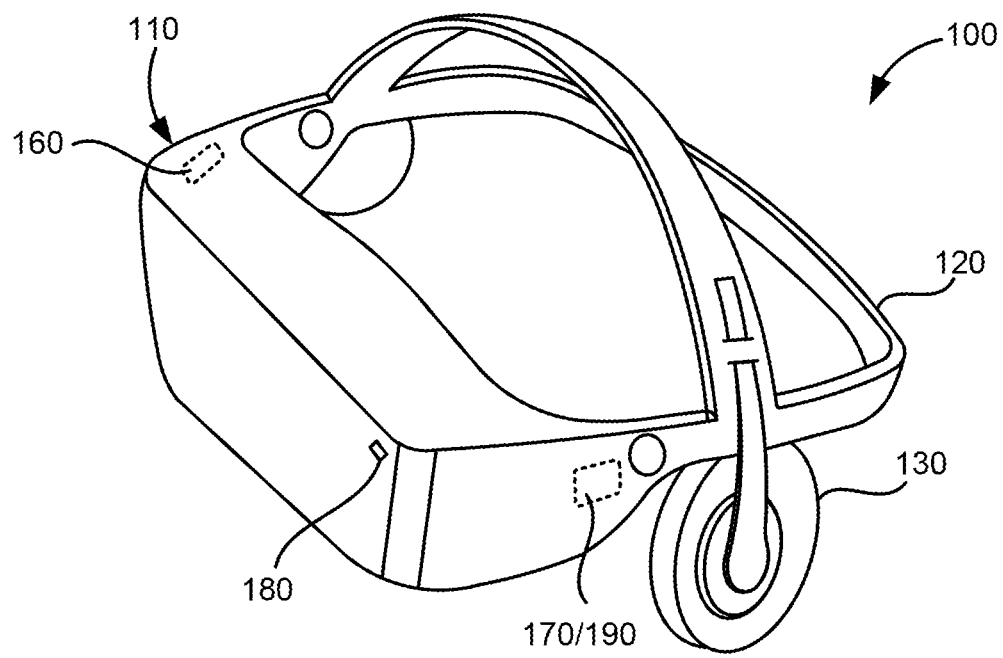
FIGS. 2A and 2B are perspective views of an example head mounted display device, in accordance with implementations as described herein.
Figure 2B:
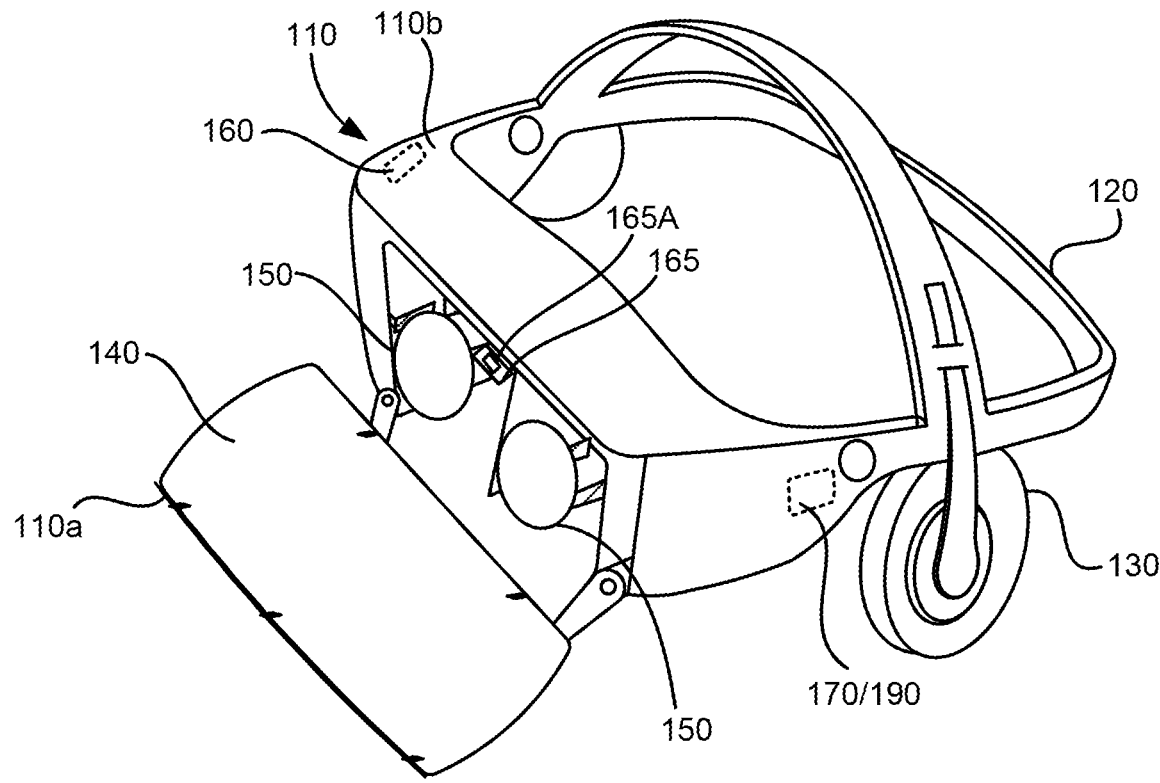

The example implementation shown in FIG. 1 includes one handheld electronic device 102 in communication with the HMD 100, for data exchange with the HMD 100, and interaction with the virtual objects, virtual elements, virtual features, and the like in the virtual environment generated by the HMD 100. However, in some implementations, more than one handheld electronic device 102 may be operably coupled with, and in communication with, the HMD 100, and may operate together, or separately, for interaction in the virtual environment FIGS. 2A and 2B are perspective views of an example HMD, such as, for example, the HMD 100 worn by the user in FIG. 1 to generate an augmented and/or virtual reality environment. The HMD 100 may include a housing 110 coupled to a frame 120, with an audio output device 130 including, for example, speakers mounted in headphones, coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors and a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the handheld electronic device 102 in the real world, or physical environment relative to the virtual environment, and/or may be displayed to the user on the display 140 in a pass through mode, providing the user with situational awareness with respect to aspects in the real world, physical environment and/or allowing the user to temporarily leave the virtual environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the virtual environment.

Figure 3:
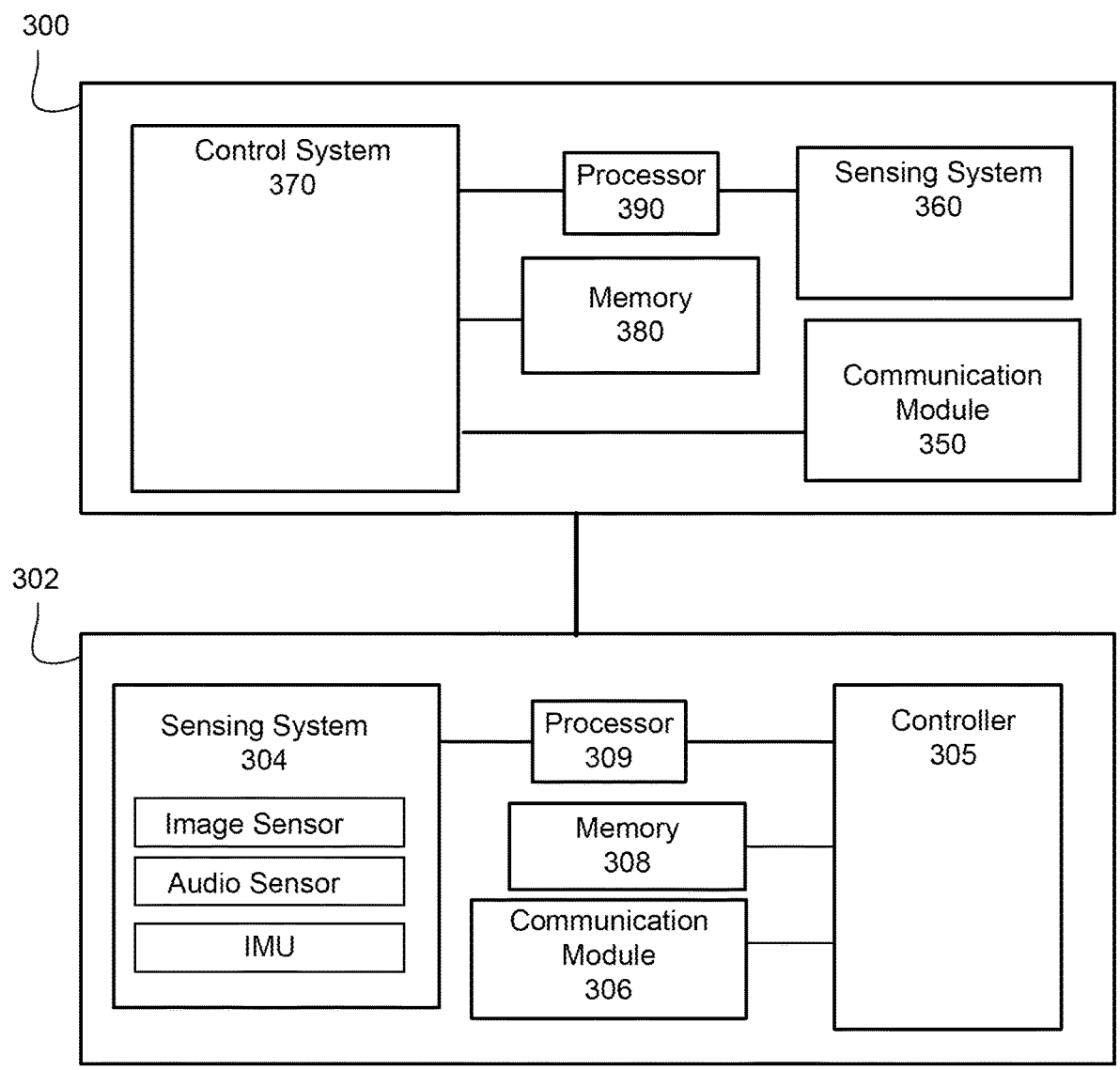
FIG. 3 is a block diagram of a head mounted electronic device and a handheld electronic device, in accordance with implementations as described herein.

A block diagram of a system for context sensitive user interface activation in an augmented and/or virtual reality environment is shown in FIG. 3. The system may include a first electronic device 300 in communication with a second electronic device 302. The first electronic device 300 may be, for example an HMD as described above with respect to FIGS. 1, 2A and 2B, generating and displaying a virtual environment to the user, and the second electronic device 302 may be, for example, a handheld electronic device as described above with respect to FIG. 1, that is in communication with the first electronic device 300 to facilitate user interaction with the virtual environment generated and displayed by the first electronic device 300.

The first electronic device 300 may include a sensing system 360 and a control system 370, which may be similar to the sensing system 160 and the control system 170, respectively, shown in FIGS. 2A and 2B. The sensing system 360 may include numerous different types of sensors, including, for example, a light sensor, an audio sensor, an image sensor, a distance/proximity sensor, and/or other sensors and/or different combination(s) of sensors, including, for example, an image sensor positioned to detect and track the user's eye gaze, such as the gaze tracking device 165 shown in FIG. 2B. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300.

In addition to providing for the exchange of data between the first electronic device 300 and the second electronic device 302, the communication module 306 may also be configured to emit a virtual ray or a virtual beam as described above. The second electronic device 302 may include a sensing system 304 including, for example, an image sensor and an audio sensor, such as is included in, for example, a camera and microphone, an inertial measurement unit, a touch sensor such as may be included in a touch sensitive surface of a handheld electronic device, or controller, or smartphone, and other such sensors and/or different combination (s) of sensors. A processor 309 may be in communication with the sensing system 304 and a controller 305 of the second electronic device 302, the controller 305 having access to a memory 308 and controlling overall operation of the second electronic device 302.

A variety of different virtual objects, virtual manipulation devices and/or virtual user interface controls, such as, for example, buttons, sliders, scroll lists and the like, may be presented, for example, three-dimensionally, to the user for selection, manipulation, actuation and the like in the virtual environment. Determining, based a virtual contact detected between the user and a virtual object, whether or not a user command should be executed to, for example, select a virtual object and/or cause some other action to be executed in the virtual environment may be difficult in this situation, when multiple virtual objects are displayed to the user in this manner, and are available for selection by the user in the virtual environment through a variety of different input methods as described above. That is, it may be difficult to determine whether a detected virtual contact between a user and a virtual object represents a user command to, for example, select the virtual object, particularly when more than one virtual object is displayed to the user in the virtual environment.

FIGS. 4A-4F and 5A-5F illustrate a third person view of a user interacting with a virtual display of virtual objects (as seen by the user) in a virtual environment generated and displayed within the HMD 100. Although the virtual objects would not be seen by a third person observer of the user, this view illustrates the interactions between the user and the virtual objects. In this example implementation, a plurality of virtual objects A, B, C, D and E are displayed by the HMD 100 to the user in the virtual environment, and are available for selection and/or manipulation by the user, using, for example, a reach and grab action of the user's hand and/or the handheld electronic device 102, and/or a virtual beam generated by the handheld electronic device 102 to point to a virtual object to be selected, simply for ease of discussion and illustration. However, as noted above, other types of inputs may be received through for example, user hand and/or arm gestures including reach/grab/swipe type movements, user manipulation of the handheld electronic device 102 and/or the HMD 100 to facilitate the user's interaction with virtual objects in the virtual environment. The plurality of virtual objects A through F may be displayed to the user by the HMD 100 for user selection, manipulation, interaction and the like so that they appear to be arranged along different planes, or staggered, to enhance the three-dimensional effect of the virtual environment.

The arrangement of the virtual objects A, B, C, D and E may be virtually displayed in different ways, depending on the particular implementation. For example, in some implementations, the plurality of virtual objects A through E may be arranged in one virtual plane. In some implementations, the plurality of virtual objects A through E may be arranged in different planes. In some implementations, virtual objects may be arranged or grouped based on various factors such as applicability, position of the user, and other such factors. In the example implementation shown in FIGS. 4A-4E and 5A-5F, virtual objects A, C and E are arranged in one virtual plane, and virtual objects B, D and F are arranged in another virtual plane, simply for ease of discussion and illustration.

Figure 4A:
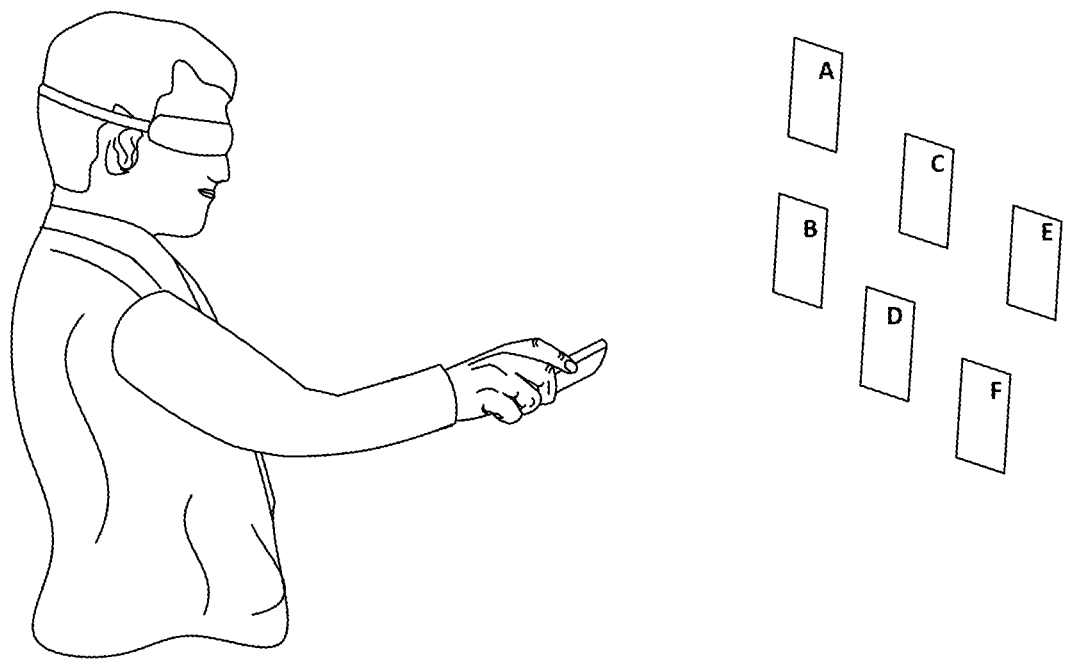
FIGS. 4A-4F and FIGS. 5A-5F are third person views illustrating user interaction with one or more virtual objects in an augmented and/or virtual reality environment, in accordance with implementations as described herein.
Figure 4B:
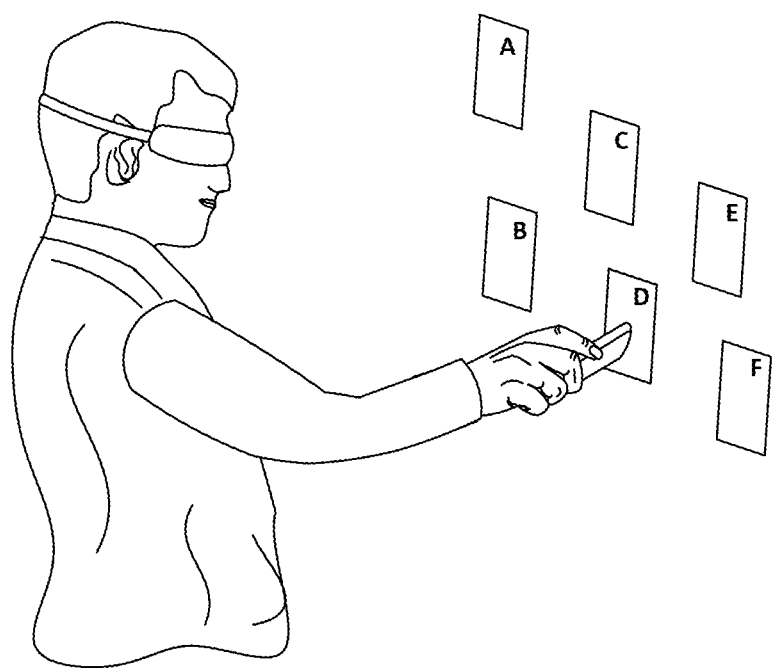
Figure 4C:
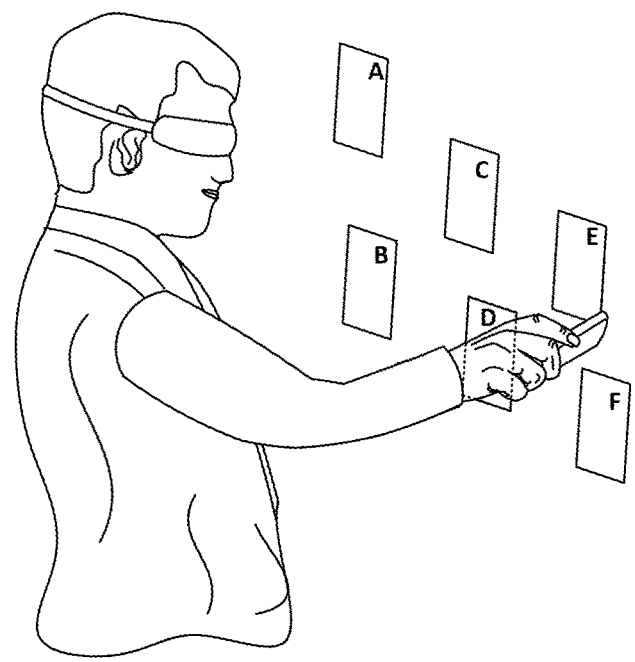
Figure 5A:
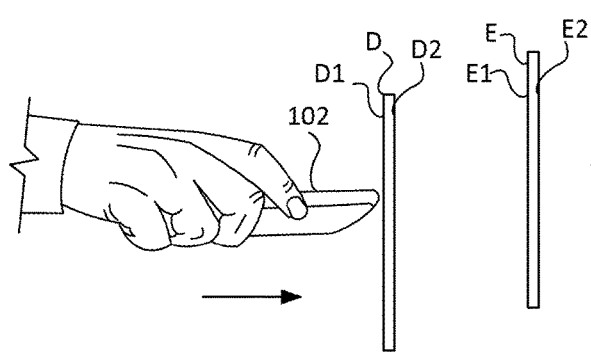
Figure 5B:
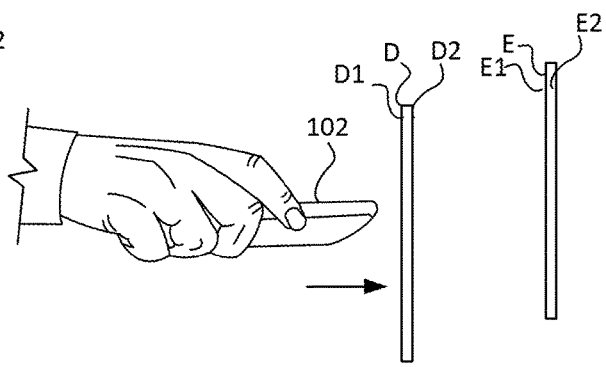
Figure 5C:
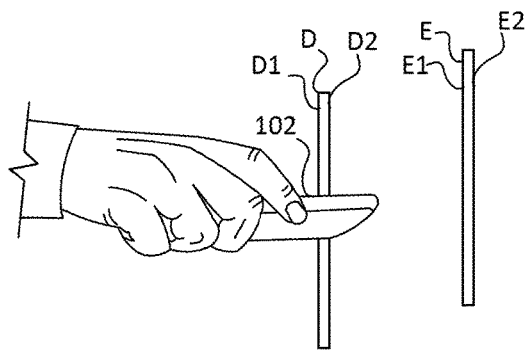

As shown in FIGS. 4A-4B and 5A-5B, a user may direct a designated selection device (for example, the real user's hand and/or the physical handheld electronic device 102, another part of the user's body whose position is detected and tracked by the system, a virtual beam generated by the handheld electronic device 102 and/or the HMD 100, and the like, as described above) toward the virtual object D, of the plurality of virtual objects A-F, with the intention of selecting the virtual object D. As the virtual object D provides no physical resistance or boundary to the user's movement toward the virtual object D, the user may break, i.e., intersect, a virtual plane of the virtual object D in the virtual environment, or move through the virtual object D, as shown in FIG. 4C and FIG. 5C, and toward the virtual object E. In particular, the user may move through a front facing side D1 and through a rear facing side D2 of the virtual object D, and approach a front facing side E1 of the virtual object E positioned behind the object D in the arrangement of virtual objects A-F.

Figure 4D:
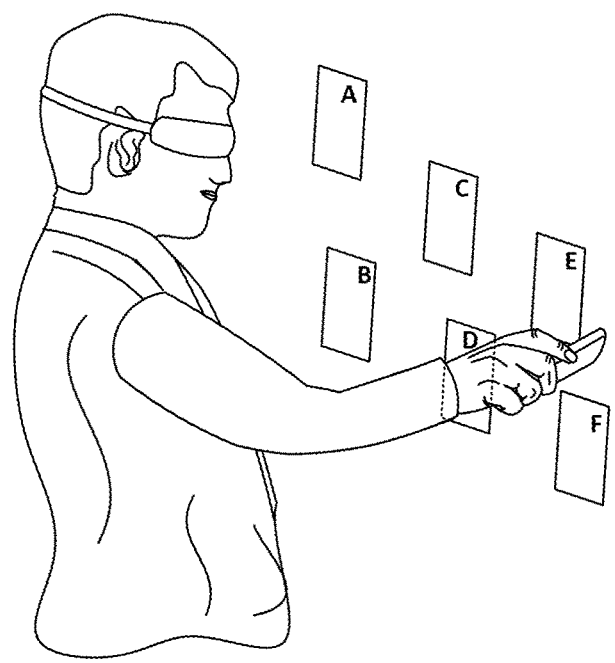
Figure 4E:
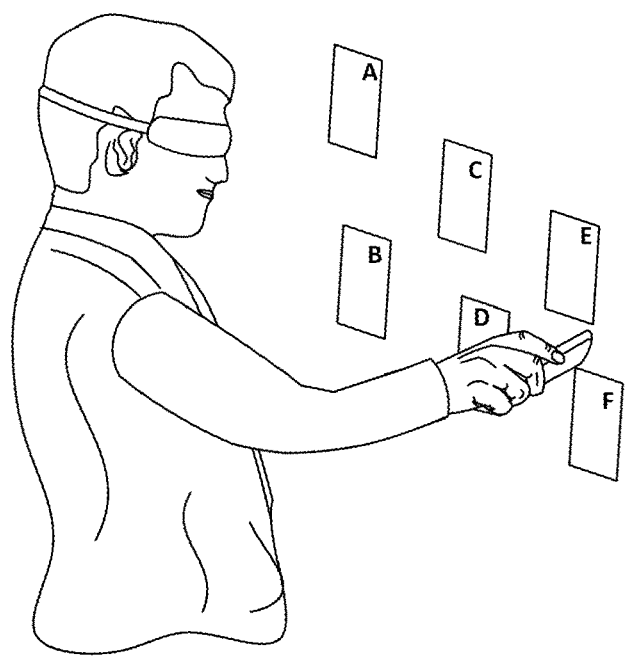
Figure 4F:
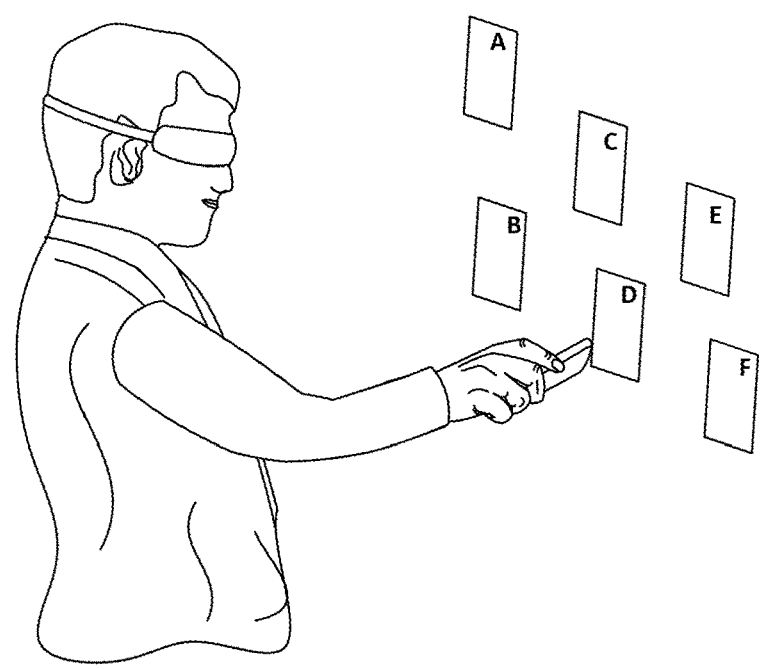
Figure 5D:
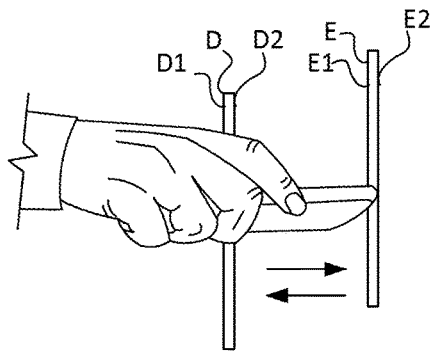
Figure 5E:
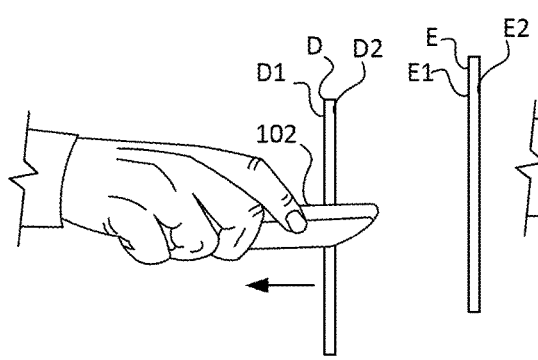
Figure 5F:
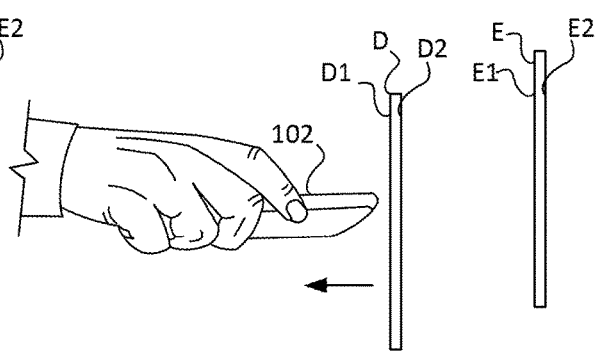

In some situations, the user may realize he has moved all the way through the virtual object D and is approaching the front surface E1 of the virtual object E, and may consciously stop the forward motion of the designated selection device before reaching the front facing side E1 of the virtual object E. In some situations, the user may not realize the physical extent of this selection motion relative to the virtual objects D and E until the item selector has passed through the front facing side E1 and the rear facing side E2 of the virtual object E, passing all the way through the virtual object E. As it was the user's intention to select the virtual object D, and not the object E, the user may reverse direction, as shown in FIGS. 4D and 5D, and move back through the virtual object D, passing through the rear facing side D2 and then the front facing side D1 of the virtual object D, as shown in FIGS. 4E-4F and FIGS. 5E-5F.

In the examples discussed above with respect to FIGS. 4A-4F and 5A-5F, the virtual objects displayed to the user are essentially flat objects, simply for ease of discussion and illustration. However, the principles described above may be applied to other virtual objects having other, three dimensional, planar or non-planar shapes and contours, in which a front facing side of the virtual object may be, for example, a portion of the virtual object closest to the user, and a rear facing side of the virtual object may be, for example, a portion of the virtual object furthest from the user.

The lack of physical resistance and/or physical boundaries and/or physical feedback associated with the three-dimensional virtual display of the plurality of virtual objects A-F in the virtual environment may present difficulties in determining whether or not a user command is to be executed in response to a detected virtual contact (and difficulties in determining intent of the user based on the detected virtual contact) which are not typically encountered in a two-dimensional interactive space. For instance, when using a mouse to select an object from a two-dimensional display, movement of the mouse cursor is limited by the physical confines of the display. Similarly, when using a finger to select an object displayed on a touchscreen, movement of the user's finger on the touchscreen is limited by the physical edges defining the size of the touchscreen. In contrast, in the example shown in FIGS. 4A-4F and 5A-5F, because the user's movement in the physical space and corresponding movement in the virtual environment is not physically limited in this manner, and the user and/or selection device can continue to move after contacting one of the virtual object(s) A-F, it may be difficult for the system to determine whether a user command is to be executed based on the detected virtual contact. For example, in this example, it may be difficult for the system to determine whether the user intended to select the virtual object D, or the virtual object E, or the virtual object D and then the virtual object E in sequence, and thus it may be difficult to determine whether or not a particular virtual object is to be selected or actuated and/or a particular action carried out in the virtual environment.

In some instances, movement through a virtual object in the virtual reality environment as discussed above may be addressed by, for example, moving the virtual display of the virtual object once a virtual contact or virtual interaction with the virtual object, such as the virtual contact described above, is detected, or by eliminating the virtual display of other virtual objects once the virtual interaction/virtual contact with the virtual object is detected, and the like. However, these types of relatively sudden changes in the virtual environment may disassociate the user from the virtual environment, and/or may break the user's virtual presence, thus detracting from the user's immersive virtual experience.

In a system and method, in accordance with implementations as described herein, the system may determine what, if any, action is to be performed and/or what, if any, command is to be executed in the virtual environment (i.e., a user intention with respect to virtual object selection and/or manipulation, or other action in the virtual environment based on the detected virtual contact), even though a user may move through one or more virtual objects. In particular, the system may be configured so that the user can move through a virtual object, for example, a virtual object corresponding to a virtual selection button for user interaction in the virtual environment, and compensate so that other virtual objects/selection buttons are not inadvertently triggered as the user moves through the physical environment and in a corresponding manner in the virtual environment, and so that the user's movement in the physical environment does not trigger unintended consequences in the virtual environment. In other words, in implementations described herein, accuracy may be improved in recognizing that a virtual contact with a virtual object in the virtual environment corresponds to a user command, to, for example, select the virtual object, particularly when more than one virtual object is displayed to the user in the virtual environment. Therefore, the precision with which a user can interact with virtual objects in the virtual space may be increased.

In some implementations, an intended virtual contact between a user, for example, a user's hand and/or arm, or other body part, a designated selection device controlled by the user, and a virtual object may be discriminated from an unintended virtual contact between the user and a virtual object based on, for example, an approach velocity at the point of virtual contact between the user and the virtual object. In some implementations, an intended virtual contact between a user, for example, a user's hand and/or arm, or other body part, a designated selection device controlled by the user, and a virtual object may be discriminated from an unintended virtual contact between the user and a virtual object based on, for example, an approach acceleration at the point of virtual contact between the user and the virtual object. In some implementations, an intended virtual contact between a user, for example, a user's hand and/or arm, or other body part, a designated selection device controlled by the user, and a virtual object may be discriminated from an unintended virtual contact between the user and a virtual object based on, for example, an approach direction at the point of virtual contact between the user and the virtual object. In some implementations, this may include the six-degree-of-freedom tracking of the designated selection device in the three-dimensional physical environment for translation of that movement into a corresponding movement in the virtual environment, allowing for determination of the approach velocity and/or acceleration and/or the approach direction at the point of virtual contact between the user and the virtual object. In some implementations, the system may be configured to detect and/or track the user's body, and/or designated parts of the user's body, in the physical space, so that the system is tracking the orientation of the user relative to the virtual environment substantially real time, and translate the detected and/or tracked movement into the virtual environment relative to the virtual objects displayed to the user.

An example virtual object 700 is shown in FIGS. 6A-6D. Simply for ease of discussion and illustration, the example virtual object 700 has a three-dimensional, substantially rectangular shape having a front facing side 701 (a side of the virtual object 700 intended to be facing a user, for interaction with the user), a rear facing side 702 (a side of the virtual object 700 intended to be facing away from the user), lateral sides 703 and top and bottom sides 704. However, virtual objects to be displayed may take a multitude of other forms, depending on the capabilities of the system, a particular virtual immersive experience, options to be displayed and other such factors.

In some implementations, thresholds for approach velocity and/or acceleration at a point of virtual contact between the user and the virtual object 700 may be defined, and may be considered, in some implementations together with approach direction(s) or virtual contact area, to determine whether a particular selection should be made based on the detected virtual contact. Thresholds for approach velocity and/or acceleration at the point of virtual contact may vary based on, for example, a particular virtual environment, context associated with a particular scenario in the virtual environment in which a selection is being determined, characteristics associated with the designated selection device in the virtual environment, user history and/or preferences and/or profile, and other such factors. Similarly, thresholds defining approach direction(s) and/or virtual contact area, and selection/activation of a particular virtual object based on virtual contact within a range of approach direction with respect to the virtual object and/or within a designated contact area of the virtual object may vary based on for example, a particular virtual environment, context associated with a particular scenario in the virtual environment in which a selection is being determined, characteristics associated with the designated selection device in the virtual environment, user history and/or preferences and/or profile, and/or other such factors.

Figure 6A:
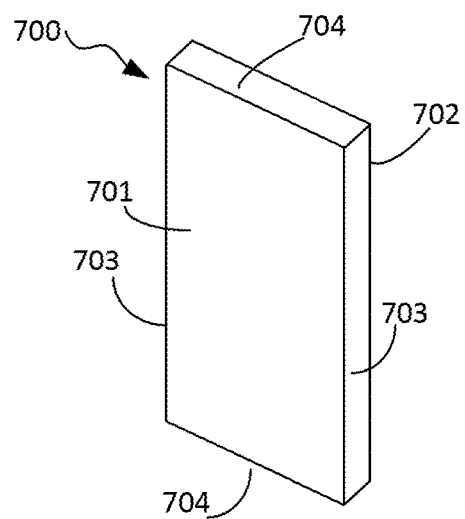
FIGS. 6A-6D illustrate various approaches to contact between a user and a virtual object in an augmented and/or virtual reality environment, in accordance with implementations as described herein.
Figure 6B:
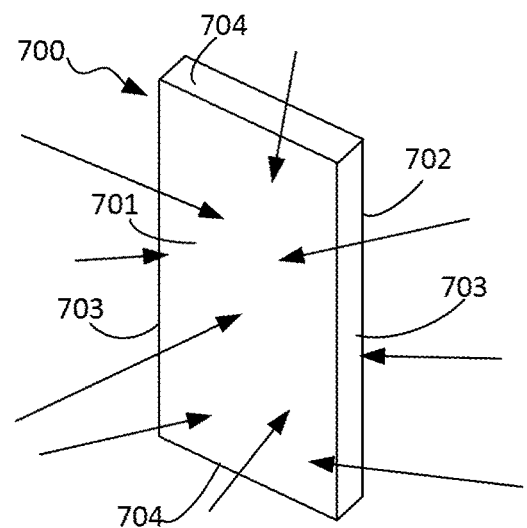

In the example shown in FIG. 6B, a variety of different approach directions, illustrated by the plurality of solid arrows shown in FIG. 6B, directed at the virtual object 700, are associated with respective instances of virtual contact between the user and the virtual object 700. In some implementations, each of the different approach directions illustrated by the solid arrows shown in FIG. 6B may represent one, or more, of an approach direction, an approach velocity, an approach acceleration, an approach area, and/or other such factors, associated with a virtual contact between the user (i.e., the designated selection device controlled by the user, including for example, the user's hand or other body part, the handheld electronic device 102 and the like) and the virtual object 700. In some implementations, the approach direction may be detected based on a designated feature of the virtual object, such as, for example, the front facing side 701 of the virtual object 700 in the example shown in FIG. 6B. In some implementations, the approach may be measured, for example, in terms of an angle with respect to the designated feature, or other such unit of measurement. In some implementations, the approach may be detected and measured based on a portion, or area, of the virtual object 700 at which the virtual contact is first detected. In some implementations, virtual contact directed at the front facing side 701 of the virtual object 700, identified by the solid arrows shown in FIG. 6B, may be identified as a deliberate contact corresponding to a command to select or otherwise actuate or manipulate the virtual object 700.

Figure 6C:
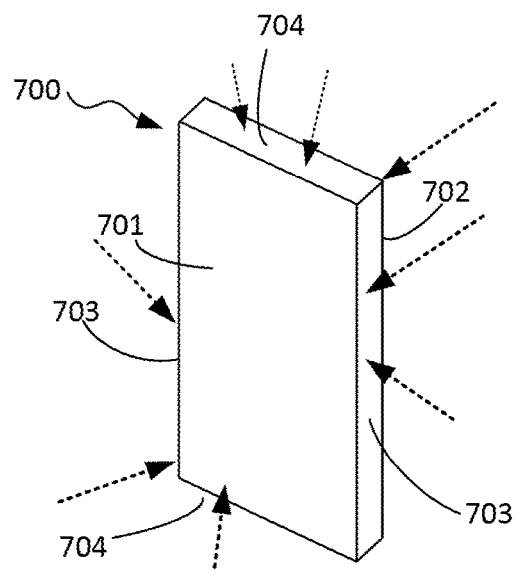

In some implementations, virtual contact directed at, for example, the rear facing side 702 of the virtual object 700, identified by the dashed arrows shown in FIG. 6C, may be identified as an inadvertent or accidental contact. In some implementations, the system may determine that selection of the virtual object 700 was not intended by the virtual contacts identified by the dashed arrows shown in FIG. 6C. In this situation, the system may thus determine that, in absence of other user inputs/commands, the detected virtual contact at the rear facing side 702 of the virtual object 700 does not trigger execution of a corresponding command in the virtual environment. In some implementations, virtual contacts detected at the top and/or bottom sides 704, and/or at the lateral sides 703 of the virtual object 700 may be identified a deliberate virtual contact corresponding to a command to select, or actuate, or otherwise manipulate the virtual object 700. In some implementations, virtual contacts detected at the top and/or bottom sides 704, and/or at the lateral sides 703 may be identified as unintentional, or inadvertent, or accidental virtual contacts, for which selection of the virtual object 700 was not intended. A deliberate virtual contact may be considered to be a virtual contact that may have a relatively high likelihood of matching the user's actual intent of selecting the virtual object through movement, directional gaze, and the like of the user, body part, and/or manipulation of the electronic device in the real world. An unintentional virtual contact, also referred to as inadvertent or accidental virtual contact, may be considered to be a virtual contact that has a relatively low likelihood of matching the user's actual intent of selecting the virtual object through movement, directional gaze, and the like of the user, body part, and/or manipulation of the electronic device in the real world.

As noted above, the determination of whether the approach from a particular direction into contact with the virtual object 700 is intentional (and indicative of a user command to be carried out in the virtual environment), as indicated by the solid arrows shown in FIG. 6B, or unintentional/accidental, as indicated by the dashed arrows shown in FIG. 6C, may be based on numerous factors, such as, for example, a particular virtual environment, context associated with a particular scenario in the virtual environment in which a selection is being determined, characteristics associated with the designated selection device in the virtual environment, user history and/or preferences and/or profile, and other such factors.

Figure 6D:
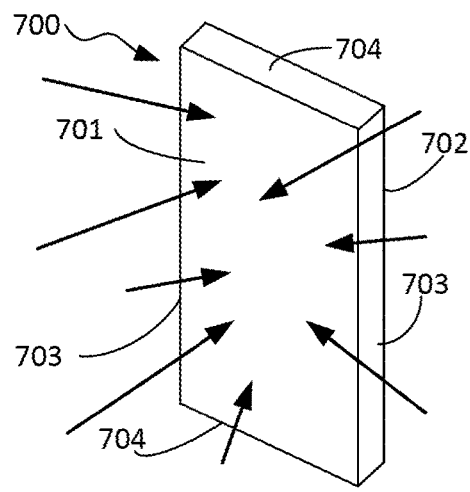

In the example shown in FIG. 6D, a variety of different virtual contacts between the user and the virtual object 700 are identified by the solid arrows. In this example, the different virtual contacts between the user and the virtual object 700 may have different approach velocities, measured, for example, by detecting and tracking of the designated selection device (the user's hand or other body part, the user holding the handheld electronic device 102, a virtual beam emitted by the handheld electronic device 102, and the like, as described above) in the physical environment and translating the detected physical movement into the virtual environment. In some implementations, a velocity threshold may be set for a particular virtual object 700 in a particular virtual environment and context, and the approach velocity of the detected virtual contact may be compared to the threshold to determine whether or not the detected virtual contact is a deliberate contact corresponding to a command for selection, actuation, and/or other manipulation of the virtual object 700. For example, a detected virtual contact that exceeds the set approach velocity threshold may indicate that the user is passing by the virtual object, intending to select another virtual object positioned beyond the virtual object 700 in the three-dimensional space. In this case, the system may identify the detected virtual contact as an unintentional contact, not intended for selection of the virtual object 700. In some situations, a detected virtual contact that is less than the set approach velocity threshold may indicate that it is the user's intent to select the virtual object 700, and the system may identify the detected virtual contact as an intentional virtual contact corresponding to a command for selection, actuation, and/or other manipulation of the virtual object 700.

In some implementations, the approach velocity threshold may be represented by a range, defined by, for example, a lower threshold and an upper threshold. The system may identify a detected virtual contact having an approach velocity that is less than the lower threshold as an unintentional contact, not intended for selection of the virtual object 700. The system may identify a detected virtual contact having an approach velocity that is greater than the upper threshold as an unintentional virtual contact indicating, for example, a user's intention to select another virtual object positioned beyond the virtual object 700 in the virtual environment. A detected virtual contact having an approach velocity that is greater than or equal to the lower threshold, and less than or equal to the upper threshold, or within the approach velocity threshold range defined by the upper threshold and the lower threshold, may be identified as an intentional virtual contact, corresponding to a command for selection, actuation, and/or other manipulation of the virtual object 700, and execute a corresponding action in the virtual environment.

In addition to, or instead of, the virtual contacts identified by the solid arrows in FIG. 6D having different approach velocities, the virtual contacts identified by the solid arrows in FIG. 6D may have different approach accelerations. The approach acceleration of the user's contact with the virtual object 700 may be measured, for example, by detecting and tracking of the designated selection device (the user's hand and/or other body part, the user holding the handheld electronic device 102, a virtual beam emitted by the handheld electronic device 102, and the like, as described above) in the physical environment and translating the detected physical movement into the virtual environment. In some implementations, an acceleration threshold may be set for a particular virtual object 700 in a particular virtual environment and context, and the approach acceleration of the detected virtual contact may be compared to the threshold to determine whether or not the detected virtual contact corresponds to a command for selection, actuation and/or other manipulation of the virtual object 700. For example, a detected virtual contact that exceeds the approach acceleration threshold may indicate that it is the user's intent to select another virtual object positioned beyond the virtual object 700 in the virtual environment, and the system may identify the detected virtual contact as an unintentional contact, not intended for selection of the virtual object 700. In some situations, a detected virtual contact that is less than the approach acceleration threshold may indicate that it is the user's intent to select the virtual object 700, and they system may identify the detected virtual contact as an intentional virtual contact corresponding to a command for selection, actuation or other manipulation of the virtual object 700.

In some implementations, the approach acceleration threshold may be represented by a range, defined by, for example, a lower threshold and an upper threshold. The system may identify a detected virtual contact having an approach acceleration that is less than the lower threshold as an unintentional contact, not intended for selection of the virtual object 700. The system may identify a detected virtual contact having an approach acceleration that is greater than the upper threshold as an unintentional virtual contact indicating, for example, a user intention to select another virtual object positioned beyond the virtual object 700 in the three-dimensional space. A detected virtual contact having an approach acceleration that is greater than or equal to the lower threshold, and less than or equal to the upper threshold, or within the approach acceleration threshold range defined by the upper threshold and the lower threshold, may be identified as an intentional virtual contact, corresponding to a command for selection, or actuation, or other manipulation of the virtual object 700, and execute a corresponding action in the virtual environment In some implementations, one of an approach direction, or an approach velocity, or an approach acceleration, of a detected virtual contact may be used to determine whether or not the detected virtual contact is intentional, and corresponds to a command for selecting, actuating or otherwise manipulating the virtual object 700. In some implementations, various combinations of the approach direction and/or approach velocity and/or approach acceleration may be used to determine whether or not the detected virtual contact is intentional, and corresponds to a command for selecting, actuating or otherwise manipulating the virtual object 700. In some implementations, selection of which component of the detected virtual contact (approach direction, approach velocity and/or approach acceleration) may be dependent on various different factors, such as, for example, a particular virtual environment, context associated with a particular scenario in the virtual environment in which a selection is being determined, characteristics associated with the designated selection device in the virtual environment, user history and/or preferences and/or profile, and other such factors.

Figure 7A:
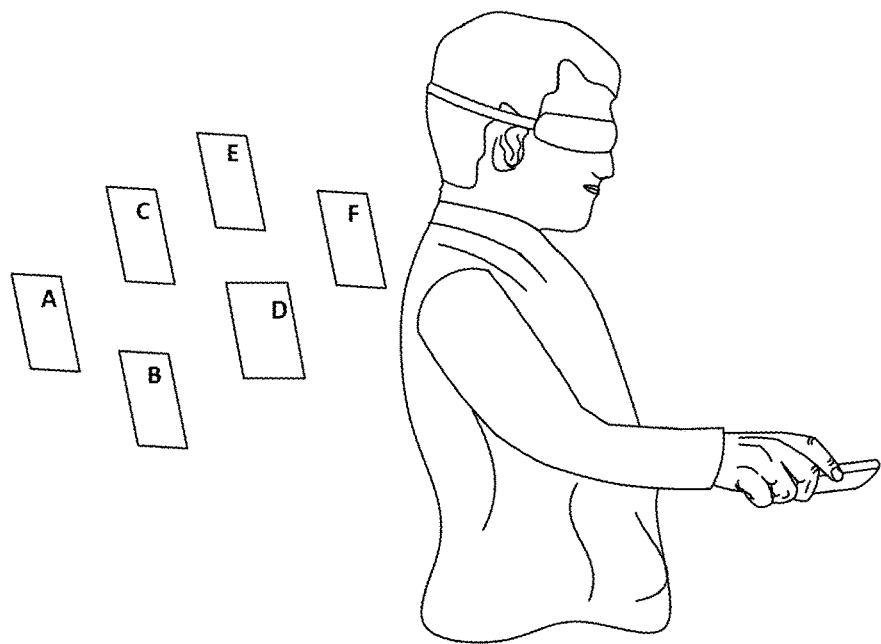
Figure 7B:
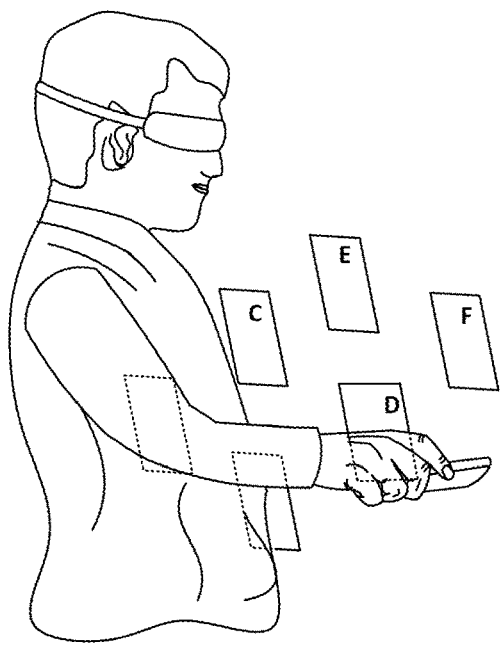

FIGS. 7A-7J are third person views (similar to the other third person views) of a user interacting with a virtual display of virtual objects in a virtual environment generated and displayed by the HMD 100. As shown in FIGS. 7A and 7B, as the user moves through the physical environment in which the immersive virtual environment is generated and displayed to the user by the HMD 100, at times the user may be positioned so that virtual objects available for selection and actuation by the user may be positioned behind the user, as shown in FIGS. 7A and 7B, rather than in front of the user as shown in FIGS. 4A-4F. As noted above, a position of the user may be detected and tracked in the physical environment, and the detected movement translated into a corresponding movement in the virtual environment. This tracking may be done, for example, via six-degree-of-freedom tracking of the designated selection device in the three-dimensional physical environment for translation of that movement in the virtual environment, as described above. In some implementations, this tracking may include tracking of the designated selection device. In some implementations, this tracking may include full body tracking of the user, allowing the system to maintain awareness, substantially real time, of a positioning and/or orientation of the user with respect to virtual objects in the virtual environment. The user's position and orientation with respect to the virtual objects may be taken into consideration, in addition to, or instead of, the approach velocity and/or approach acceleration and/or direction/area discussed above in determining whether or not a detected virtual contact with a virtual object is intentional, and corresponds to a user command.

In a situation in which the virtual objects are positioned behind the user, as shown in FIG. 7A, the user may move backwards, and unintentionally make virtual contact with one of the virtual objects, as shown in FIG. 7B. In the example shown in FIG. 7B, a virtual contact may be detected between the user and the virtual object D, with the contact detected on the front facing side, or activation area, of the virtual object D. A virtual contact detected in this manner (with the virtual objects positioned behind the user, and out of sight of the user) may have an approach direction and/or approach velocity and/or approach acceleration which would otherwise identify the detected virtual contact as an intentional virtual contact, indicating a command is to be carried out in the virtual environment. However, due to the known position of the virtual objects A-F relative to the user (and relative to the designated selection device), in this example, behind the user (based on the six-degree of freedom tracking of the designated selection device within the three dimensional physical environment), the system may identify the detected virtual contact shown in FIG. 7B as an unintentional contact that does not trigger execution of a corresponding command in the virtual environment.

As noted above, in some implementations, the system may perform full body tracking of the user in the physical space, translating the full body movement of the user in the physical space to corresponding movement in the virtual environment, tracking the user's position and/or orientation relative to virtual objects in the virtual environment, substantially real time. For example, in some implementations, this may include tracking of the position and/or orientation of the user's head (for example, a front and a rear of the head). In some implementations, this may include tracking of the position and/or orientation of the user's shoulders (for example, a left shoulder and a right shoulder). In some implementations, this may include tracking of the position and/or orientation of the user's arms/elbows/hands (for example, a left arm/elbow/hand and a right arm/elbow/hand). In some implementations, this may include tracking of the position and/or orientation of the user's torso (for example, a chest and a back). In some implementations, this may include tracking of the position and/or orientation of the user's, knees (for example, a left knee and a right knee). In some implementations, this may include tracking of the position and/or orientation of the user's feet (for example, a left foot and a right foot). In some implementations, this may include tracking of the position and/or orientation of more, or fewer, body parts of the user. In some implementations, a body part may be tracked so that the system may detect a position and orientation at which the body part makes virtual contact with a virtual object to determine whether or not the detected virtual contact corresponds to a user command for action in the virtual environment.

For example, in some implementations, the system may discriminate between a first virtual contact made between a first part of a user's hand (for example, the user's fingertips) and a virtual object, and a second virtual contact made between a second part of the user's hand (for example, the user's palm or back side of the user's hand) and a virtual object. In this situation, the system may determine that the first virtual contact is a deliberate contact, corresponding to a user command to execute an action in the virtual environment, whereas the second contact is an inadvertent contact, with no action in the virtual environment intended as a result of the virtual contact. In some implementations, the system may discriminate between a first virtual contact made between a first body part, for example, a right hand of the user, and a virtual object, and a second virtual contact made between a second body part, for example, a left hand of the user, and the virtual object. In this situation, the system may be set to be more sensitive to virtual contacts made with the user's dominant hand (for example, the user's right hand), than to virtual contacts made with the user's non-dominant hand, which is typically more prone to inadvertent movement. Thus, in this situation the system may determine that the first virtual contact is a deliberate contact, corresponding to a user command to execute an action in the virtual environment, whereas the second contact is an inadvertent contact, with no action in the virtual environment intended as a result of the virtual contact. These types of determinations may be made based on, for example, a context of the virtual environment and the virtual object associated with the detected virtual contact, set user preferences, set system preferences, and the like.

Figure 7C:
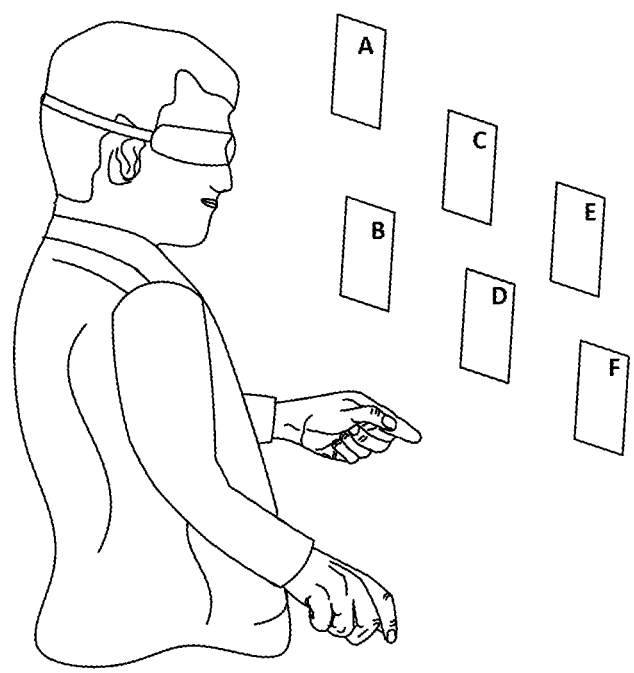
Figure 7D:
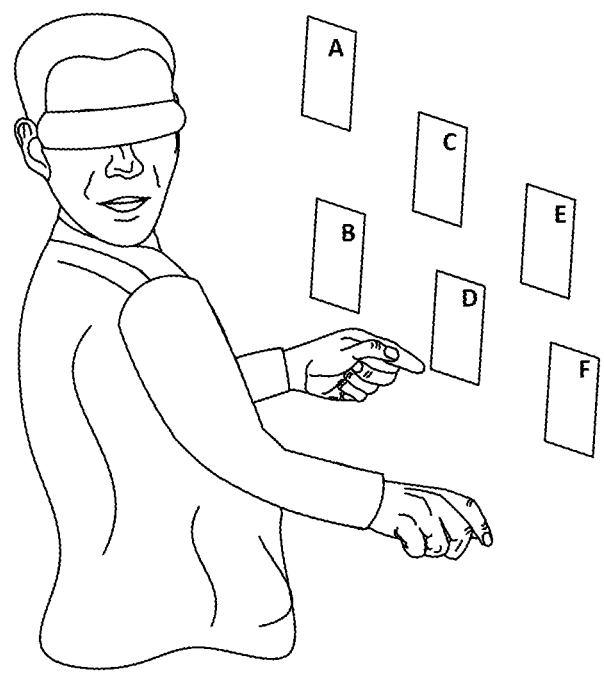

In the example shown in FIG. 7C, the virtual objects A through F are positioned in front of the user in the virtual environment, and the system may be set to track the position of the user relative to the virtual objects A-F in the virtual environment by, for example, body tracking (including some set of preset body parts of the user) as described above, and may also track a position and orientation of the HMD 100 and/or the handheld electronic device 102, as described above. In FIG. 7D, the user has directed his attention away from the virtual objects A-F to, for example, communicate with another user, familiarize himself with other virtual elements in the virtual environment, and the like. As a result of the user turning his head, as shown in the example of FIG. 7D, the virtual objects A-F are no longer within the field of view of the user. This may be determined by, for example, a position and/or orientation of the user's head determined by the system based on, for example, tracking of the user's head, position data from the HMD 100, and the like. In the process of turning his head in the manner shown in FIG. 7D, the user may have also shifted a position of, for example, his left arm/hand, so that the user's left hand makes virtual contact with the virtual object D.

In some implementations, the movement of the virtual objects A-F out of the field of view of the user in this manner, may render the virtual objects (for example, the virtual objects that are no longer within the field of view of the user) inactive. Thus, in this example, even though virtual contact has been detected between the user's hand and the virtual object D, for example, at an approach velocity and/or acceleration and/or contact area that would typically correspond to an intentional user command, as described above, because the virtual object D is no longer within the field of view of the user, the virtual object D is, essentially, disabled, and no action is taken as a result of the detected virtual contact. In some implementations, one or more virtual objects that move outside the field of view of the user may be rendered, for example, inactive (e.g., disabled), in this manner, for example, for a preset amount of time, or until the virtual objects move back into the field of view of the user, and the like.

In some implementations, a virtual contact detected between a specific body part and a specific virtual object in the virtual environment may trigger action in the virtual environment, whereas virtual contact between the specific body part and another virtual object, or virtual contact between another body part and the specific virtual object, may not trigger action in the virtual environment. In this situation, the determination as to whether or not a particular virtual contact triggers an action in the virtual environment may be based on, for example, a particular application and associated settings, context of a particular virtual scene and the virtual elements included in the virtual scene, user preferences and profiles, and the like.

Figure 7E:
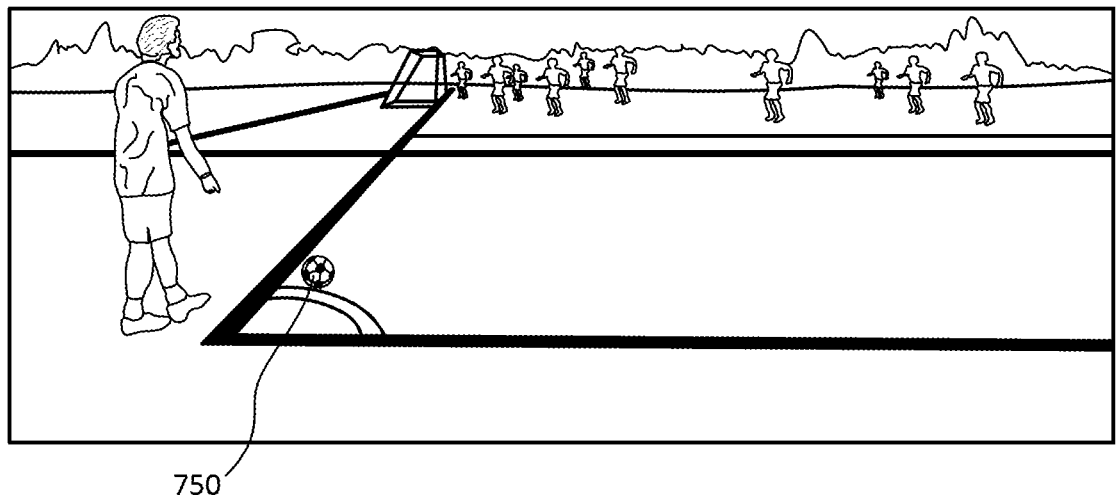

In the example shown in FIG. 7E, a user engaged in a virtual soccer game may encounter a virtual object 750 representing a ball. In some situations, the system may be set so that a virtual contact detected between the user's foot and a virtual object is ignored. However, in this example, virtual contact between the user's foot and the virtual soccer ball 750 may be recognized as a command triggering an action in the virtual environment, based on the context of this particular application, the specific virtual object 750 involved, and the specific body part involved. In some implementations, in addition to requiring that the detected virtual contact be between the specific body part (in this example, the user's foot) and the specific virtual object (in this example, the virtual soccer ball 750) to trigger an action in the virtual environment, the system may also take the approach velocity and/or approach acceleration and/or contact area/direction into consideration when determining whether or not the detected virtual contact is to trigger an action in the virtual environment. For example, in the example shown in FIG. 7E, a virtual contact between the user's foot and the virtual soccer ball having an approach velocity and/or an approach acceleration below a set threshold may indicate that the virtual contact may not have been deliberate, and intended to result in a corresponding action in the virtual environment. For example, a detected contact below the set velocity and/or acceleration thresholds may indicate that the user inadvertently, or unknowingly, walked into, or past, the virtual soccer ball 750. In contrast, a detected contact at or above the set velocity and/or acceleration thresholds, and/or within a set contact area/direction, may indicate that the detected virtual contact corresponds to an intentional move, or kick, of the virtual soccer ball 750, and the system may virtually move the virtual soccer ball 750 in a corresponding direction, and with a corresponding force, in the virtual environment.

Figure 7F:
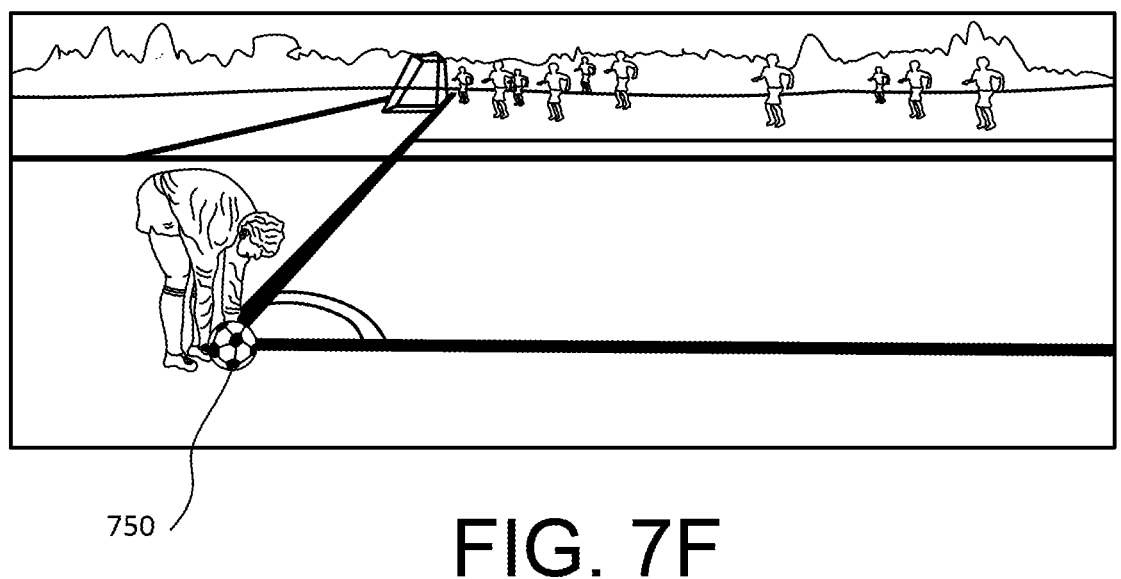

In some implementations, these thresholds for triggering action in the virtual environment may be different when virtual contact is detected between the virtual object (such as, for example, the virtual soccer ball 750) and a different body part. For example, a picking up, or flicking action, of the virtual soccer ball 750, may be triggered by a relatively simple contact between the user's hand and the virtual soccer ball 750, as shown in FIG. 7F, with relatively broad, nor no, thresholds applied in determining whether or not a corresponding action is to be triggered. In this example, as the user must bend, or stoop, to reach for the virtual soccer ball 750, the system may determine that any contact between the user's hand and the virtual soccer ball 750 in this particular application is deliberate, and trigger the corresponding action.

In some implementations, a user may choose to teleport to a new virtual location, or to further explore a virtual object displayed in the virtual environment. In the example shown in FIG. 7G, a user viewing a virtual scene 400, for example, on the display 140 of the HMD 100, directs a virtual beam toward a virtual object 450, or virtual car 450, in the virtual scene 400, to teleport into the virtual car 450. The user may arrive at the teleport location, for example, the interior of the virtual car 450, with designated control devices, for example body parts such as hands, the handheld electronic device 102 and the like in a position corresponding to an active control area of the teleport location. Inadvertent user movement upon arrival at the teleport location may cause inadvertent movement of the designated control device in the active control area, and inadvertent user commands to be executed.

Figure 7H:
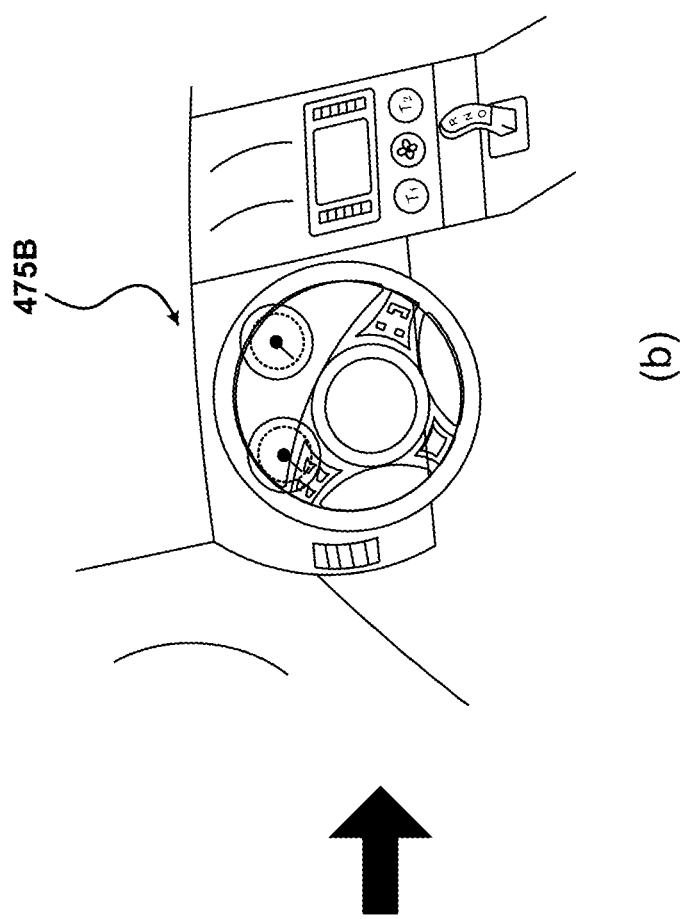
Figure 7H:
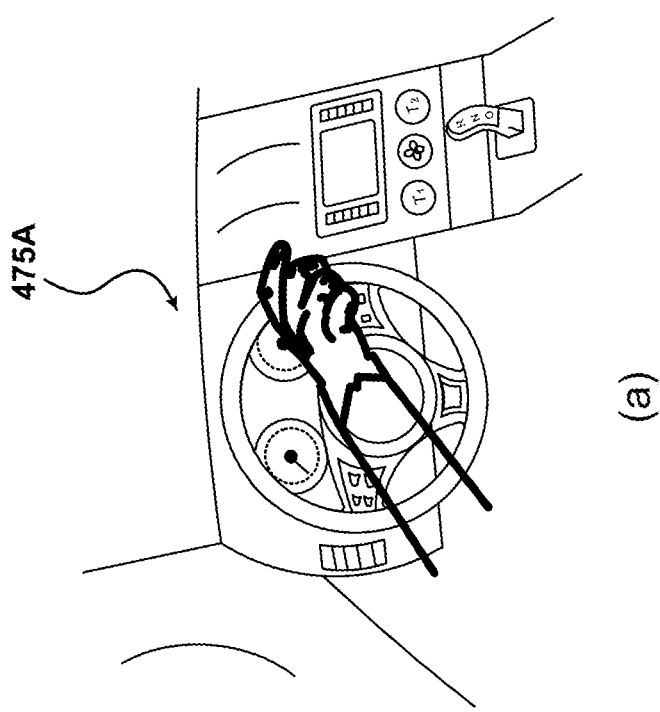

For example, as shown in FIG. 7H(a), upon teleporting, the user may arrive in the interior of the virtual car 450 with a hand within a virtual contact area of a control area, for example, a virtual steering wheel 420, of the interior of the virtual car 450. In this example, inadvertent movement of the user's hand upon arrival in the interior of the virtual car 450, with the user's hand positioned on the virtual steering wheel 420, may cause inadvertent, unwanted movement of the virtual steering wheel 420, as shown in FIG. 7H(b). To avoid this inadvertent, unwanted movement of a control mechanism upon arrival at a new teleport location, or at other points in the virtual experience at which the user may be making a transition, as described above, in some implementations, a grace period, or an inactive period, or a time out, may be built into the teleport action. During this inactive period, various control mechanisms at the new teleport location may be temporarily disabled, so that virtual contact with the various control mechanisms will not trigger action in the virtual environment. This may allow the user a set period of time to adjust to the new virtual surroundings before proceeding to engage in the new virtual environment.

Figure 7J:
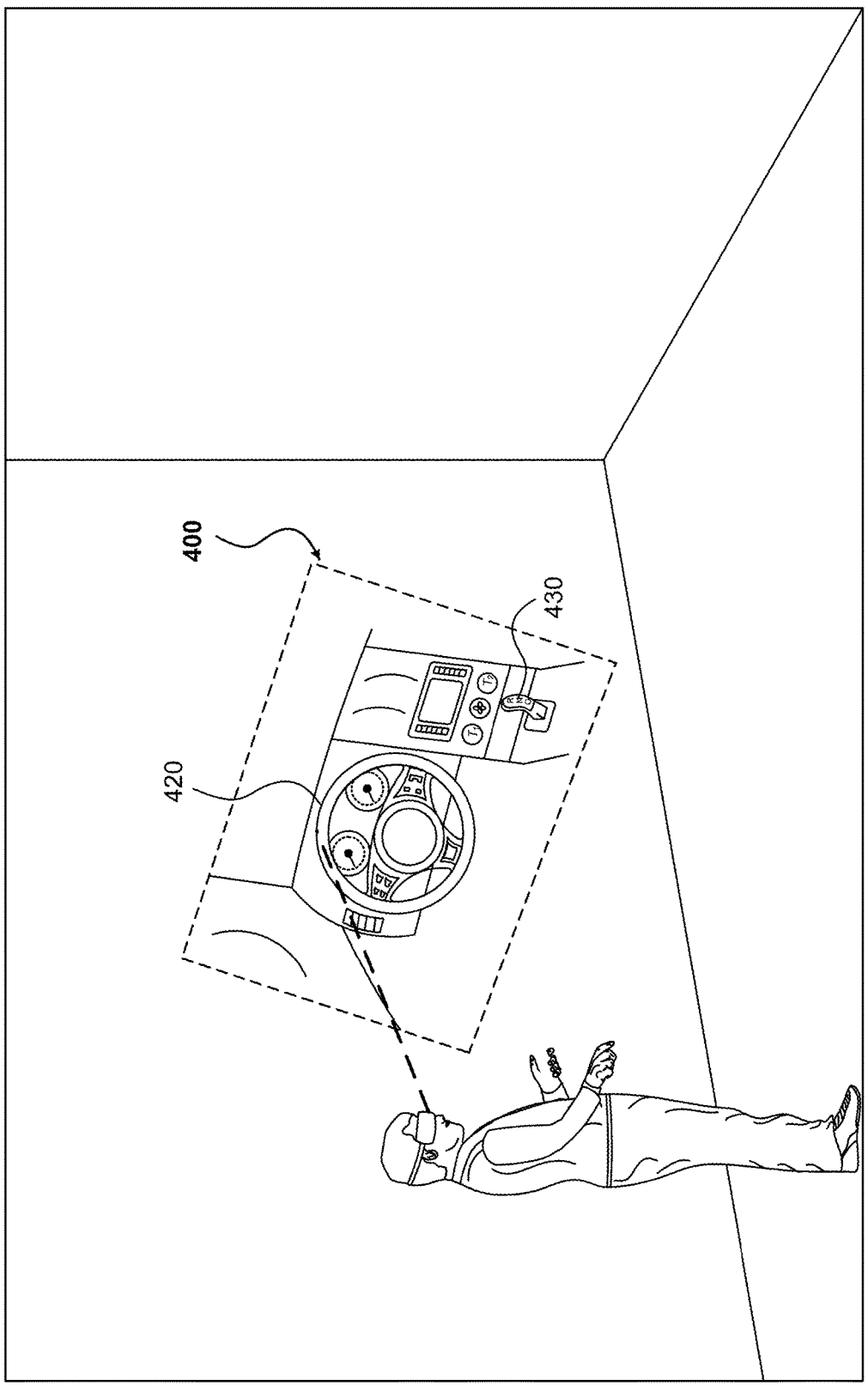

As discussed above with respect to FIGS. 7C and 7D, in some implementations, movement of a virtual object outside the user's field of view may sometimes cause the virtual object to be disabled, so that the virtual object is not inadvertently actuated by a movement of the user not intended for actuating the virtual object. In some implementations, a movement of the virtual object outside the user's field of view may be disabled, or may remain active, depending, for example, on the context of the application, the particular virtual object being actuated, settings associated with gaze and/or focus time on a particular virtual object and the like. For example, as shown in FIG. 7I, when in the virtual car 450, the user may glance down at a virtual gear shift 430, allowing the user to accurately virtually grasp the virtual gear shift 430. While maintaining a virtual grasp on the virtual gear shirt 430, the user may then look away from the virtual gear shift 430, towards, for example, the virtual steering wheel 420 and/or a track or road ahead in the virtual environment, to also engage with the virtual steering wheel 420, control the virtual car 450 as it travels along the virtual track and the like. In this example, the context of the specific virtual scene 400 viewed by the user, together with the characteristics of the specific virtual object (the virtual gear shift 430), cause the virtual gear shift 430 to remain active while the user maintains virtual contact with the virtual gear shift 430, even though the user has looked away from the virtual gear shift 430, and the virtual gear shift 430 is no longer within the field of view of the user, as shown in FIG. 7J.

The features discussed above with respect to FIGS. 7A-7J may allow the activation rules discussed above with respect to FIGS. 4A-6D to be effectively adapted based on the characteristics of a particular virtual scene, as well as the particular characteristics of the virtual objects available to the user for interaction in the virtual scene.

Figure 8:
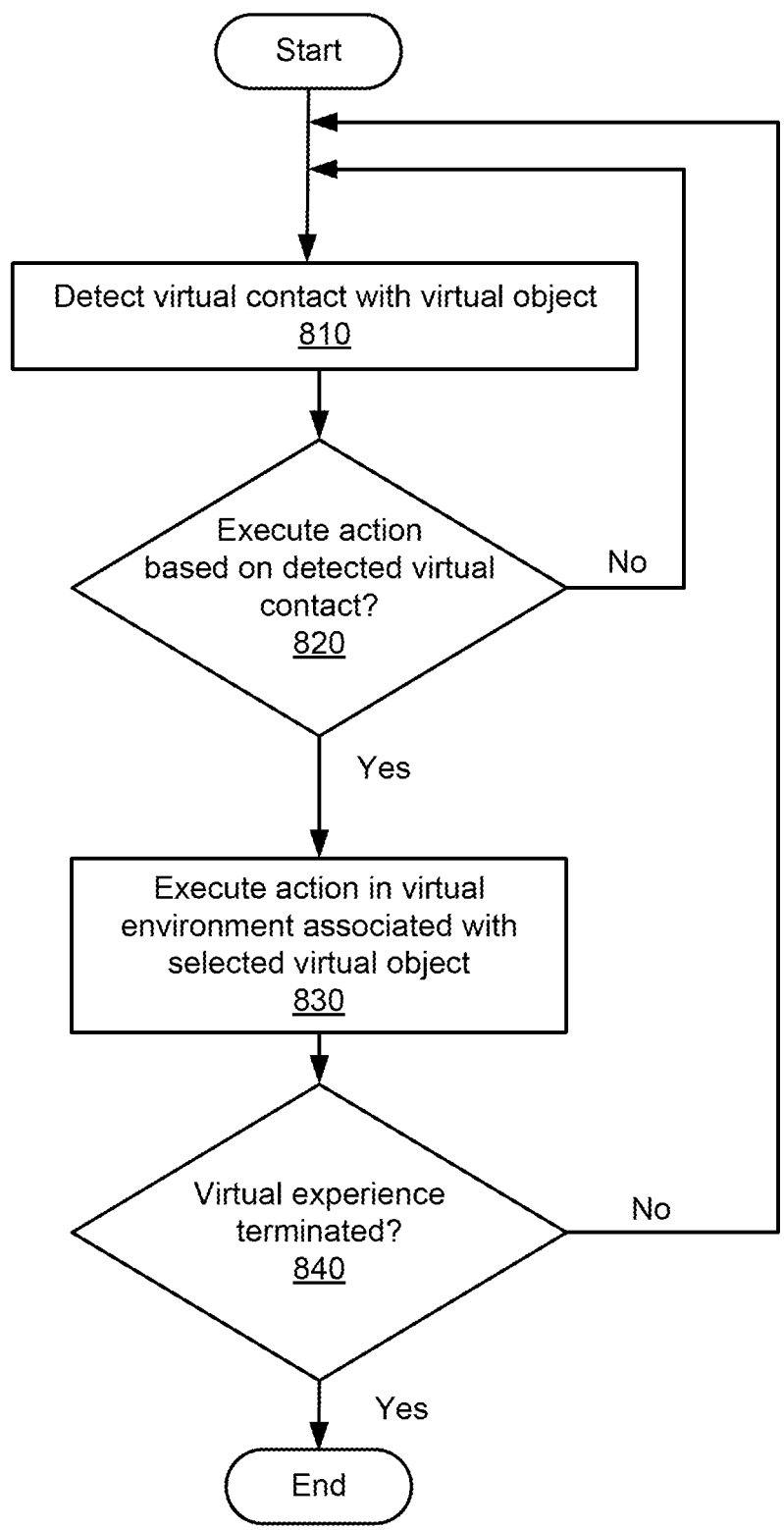
FIG. 8 is a flowchart of a method of selecting a virtual object in an augmented and/or virtual reality environment, in accordance with implementations as described herein

A method of selecting a virtual object for activation from a user interface in an augmented and/or virtual reality environment, in accordance with implementations as described herein, is shown in FIG. 8. Upon detection of a virtual contact between the user, for example, a designated selection device controlled by the user, and a virtual object displayed three-dimensionally in the virtual environment (block 810), it may be determined whether or not the detected virtual contact corresponds to a command instructing the system is to execute a particular action based on the detected contact (block 820). For example, upon detection of the virtual contact, the system may determine whether or not the detected virtual contact is intentional based on, for example, approach velocity and/or acceleration and/or direction with respect to the virtual object, context or a particular virtual environment, user settings and preferences, and the like, as described above in detail with respect to FIGS. 4A-4F, FIGS. 5A-5F, FIGS. 6A-6D and FIGS. 7A-7B. That is, as described above, the system may determine the likelihood, or probability, that a detected virtual contact between the user immersed in the virtual space and a virtual object is intended by the user for execution of further action, based on the these factors. When it is determined that the detected virtual contact is intentional, the system may determine that the virtual object has been selected, or actuated, or otherwise manipulated by the user, and may carry out an action in the virtual reality environment associated with selected virtual object (block 830). This process may be carried out until it is determined that the virtual reality experience has been terminated (block 840).

Figure 9:
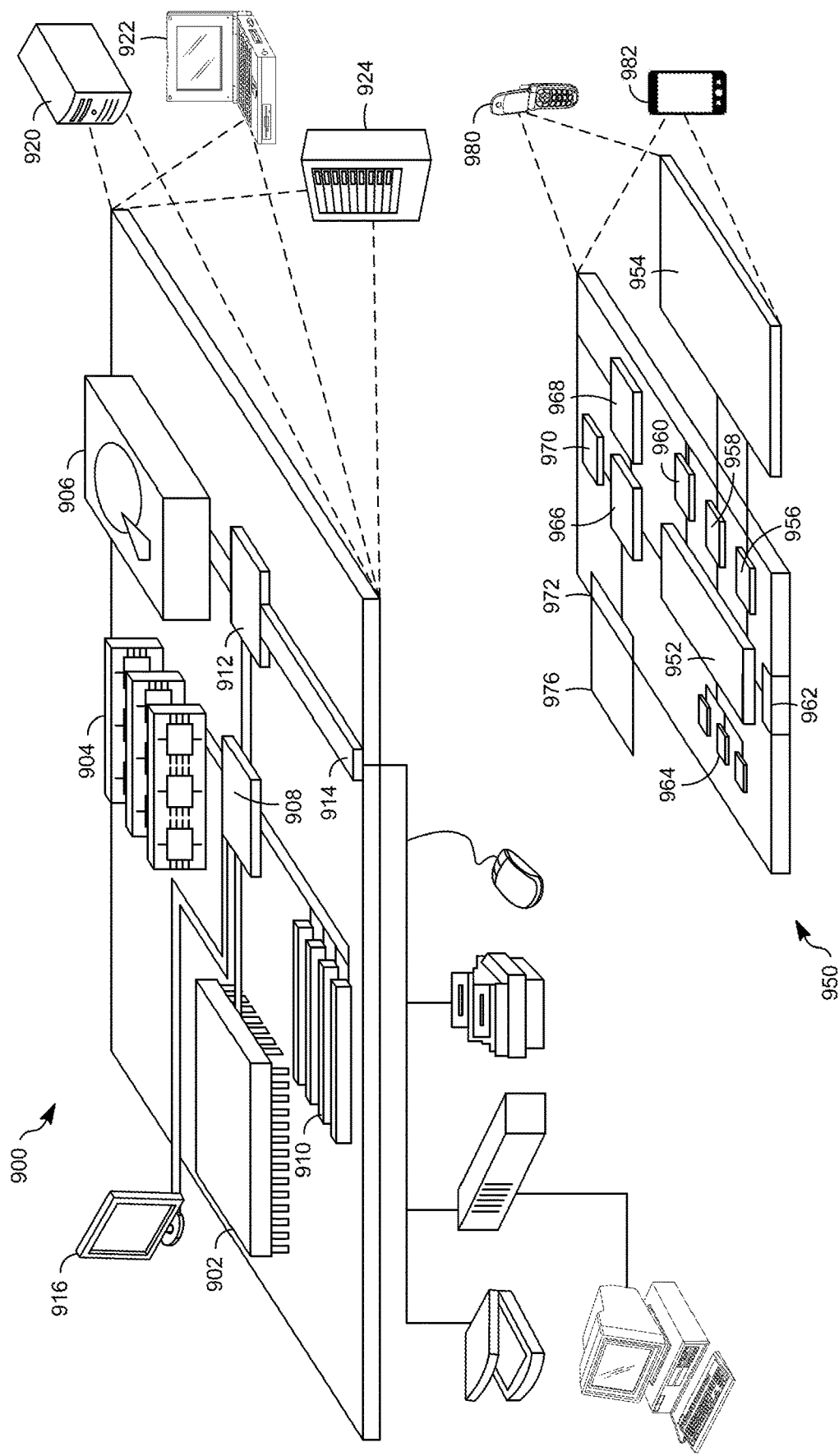
FIG. 9 shows an example of a computer device and a mobile computer device that can be used to implement the techniques described herein.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
generating a virtual environment for interacting, the virtual environment including displaying a plurality of virtual objects in the virtual environment;
detecting a characteristic of a virtual contact between a selection device and a virtual object of the plurality of virtual objects, the detecting the virtual contact including tracking a position and an orientation of the selection device relative to the plurality of virtual objects, the characteristic including one or more of an approach direction of the selection device with respect to the virtual object at a point of virtual contact, an approach velocity of the selection device with respect to the virtual object at the point of virtual contact, and an approach acceleration of the selection device with respect to the virtual object at the point of virtual contact;
determining whether the detected virtual contact corresponds to an intended or unintended virtual contact in the virtual environment, the determining based on one or more of the characteristic of the detected virtual contact and a context in the virtual environment at a time at which the virtual contact is detected; and
when it is determined that the detected virtual contact corresponds to an intended virtual contact in the virtual environment;
selecting the virtual object for actuation, and
executing an action in the virtual environment corresponding to the selected virtual object and a command corresponding to the detected virtual contact, and
when it is determined that the detected virtual contact corresponds to an unintended virtual contact in the virtual environment, ignoring the detection of the virtual contact.

2. The method of claim 1, wherein detecting the characteristic of the detected virtual contact includes detecting the approach direction of the selection device with respect to the virtual object at the point of virtual contact, and
determining whether the detected virtual contact corresponds to an intended or unintended virtual contact in the virtual environment includes comparing the detected approach direction of the detected virtual contact to a preset approach direction threshold.

3. The method of claim 2, wherein the preset approach direction threshold defines a range of approach angles with respect to an actuation surface of the virtual object, and wherein determining whether the detected virtual contact corresponds to an intended or unintended virtual contact in the virtual environment includes executing the command in the virtual environment when the detected approach direction falls within the preset range of approach angles.

4. The method of claim 2, wherein the preset approach direction threshold is defined with respect to one or more actuation areas of the virtual object, and wherein determining whether the detected virtual contact corresponds to an intended or unintended virtual contact in the virtual environment includes executing the command in the virtual environment when the detected approach direction is detected within one of the one or more actuation areas of the virtual object.

5. The method of claim 1, wherein detecting the characteristic of the detected virtual contact includes detecting the approach velocity of the detected virtual contact with respect to the virtual object, and
determining whether the detected virtual contact corresponds an intended or unintended virtual contact in the virtual environment includes comparing the detected approach velocity of the detected virtual contact to a preset approach velocity threshold.

6. The method of claim 5, wherein the preset approach velocity threshold defines a range of approach velocities with respect to the virtual object, and wherein determining whether the detected virtual contact corresponds to an intended or unintended virtual contact in the virtual environment includes executing the command in the virtual environment when the detected approach velocity falls within the preset range of approach velocities.

7. The method of claim 1, wherein detecting the characteristic of the detected virtual contact includes detecting an approach acceleration of the detected virtual contact with respect to the virtual object, and
determining whether the detected virtual contact corresponds to an intended or unintended virtual contact in the virtual environment includes comparing the detected approach acceleration of the detected virtual contact to a preset approach acceleration threshold.

8. The method of claim 7, wherein the preset approach acceleration threshold defines a range of approach accelerations with respect to the virtual object, and wherein determining whether the detected virtual contact corresponds to an intended or unintended virtual contact in the virtual environment includes executing the command in the virtual environment when the detected approach acceleration falls within the preset range of approach accelerations.

9. The method of claim 1, wherein the detected virtual contact is detected at a first surface of the virtual object, the first surface of the virtual object defining an actuation surface of the virtual object, the method further comprising:
detecting a subsequent virtual contact on a second surface of the virtual object, the second surface defining an inactive surface of the virtual object;
determining that the subsequent virtual contact does not correspond to an intended virtual contact in the virtual environment; and
ignoring the detection of the subsequent virtual contact.

10. The method of claim 1, wherein detecting a virtual contact between a selection device and a virtual object of the plurality of virtual objects includes:
detecting that the virtual object is outside of a user field of view;
determining that the detected virtual contact does not correspond to an intended virtual contact in the virtual environment; and
ignoring the detection of the virtual contact.

11. The method of claim 1, wherein detecting a virtual contact between a selection device and a virtual object of the plurality of virtual objects includes:
detecting a change in a user field of view, from a first field of view to a second field of view, wherein virtual contact is detected with the virtual object within the first field of view, and
the virtual object is outside of the second field of view;
determining that the detected virtual contact corresponds to an intended virtual contact with respect to the virtual object, with the virtual object outside of the second field of view; and
executing the command in response to the detected virtual contact.

12. The method of claim 1, wherein the selection device is at least one of a plurality of body parts of a user,
the detecting a virtual contact including tracking a position and an orientation of the plurality of body parts of the user relative to the plurality of virtual objects in the virtual environment, the detected virtual contact being detected between one of the plurality of body parts of the user and the virtual object, and
the determining whether the detected virtual contact corresponds to an intended or unintended virtual contact in the virtual environment including:
determining the context of the virtual environment at the time at which the virtual contact is detected;
determining whether the one of the plurality of body parts is matched with the virtual object for actuation of the virtual object within the determined context of the virtual environment;
executing the command in the virtual environment in response to the detected virtual contact if the one of the plurality of body parts is matched with the virtual object; and
ignoring the detected virtual contact if the one of the plurality of body parts is not matched with the virtual object.

13. The method of claim 1, wherein the selection device is at least one of a plurality of body parts of a user,
the detecting a virtual contact including tracking a position and an orientation of the plurality of body parts of the user relative to the plurality of virtual objects in the virtual environment, the detected virtual contact being detected between one of the plurality of body parts of the user and the virtual object, and
the determining whether the detected virtual contact corresponds to an intended or unintended virtual contact in the virtual environment including:
determining whether the detected virtual contact is detected between an actuation portion of the one of the plurality of body parts and an actuation portion of the virtual object based on the tracked position and orientation of the one of the plurality of body parts at a time at which the virtual contact was detected;
executing the command in the virtual environment in response to the detected virtual contact if the detected virtual contact is between the actuation portion of the one of the plurality of body parts and the virtual object; and
ignoring the detected virtual contact if the detected virtual contact is not between the actuation portion of the one of the plurality of body parts and the virtual object.

14. A system, comprising:
a computing device configured to generate a virtual environment, the computing device including a memory storing executable instructions, and a processor configured to execute the instructions to cause the computing device to:
generate a virtual environment for interaction, the virtual environment including a display of a plurality of virtual objects;
detect a characteristic of a virtual contact between a selection device and a virtual object of the plurality of virtual objects, the detecting the virtual contact including tracking a position and an orientation of the selection device relative to the plurality of virtual objects, the characteristic including one or more of an approach direction of the selection device with respect to the virtual object at a point of virtual contact, an approach velocity of the selection device with respect to the virtual at the point of virtual contact, and an approach acceleration of the selection device with respect to the virtual object at the point of virtual contact;
determine whether the detected virtual contact corresponds to an intended or untended virtual contact in the virtual environment, the determining based on one or more of the characteristic of the detected virtual contact and a context associated with a particular scenario in the virtual environment at a time at which the virtual contact is detected; and
when it is determined that the detected virtual contact corresponds to an intended virtual contact in the virtual environment:
select the virtual object for actuation, and
execute an action in the virtual environment corresponding to the selected virtual object and a command corresponding to the detected virtual contact, and
when it is determined that the detected virtual contact corresponds to an unintended virtual contact in the virtual environment, ignoring the detection of the virtual contact.

15. The system of claim 14, wherein, in determining whether the detected virtual contact corresponds to an intended or unintended virtual contact in the virtual environment, the processor is further configured to execute the instructions to cause the computing device to:
detect the characteristic of the detected virtual contact, the characteristic including one or more of an approach direction of the selection device with respect to the virtual object at a point of virtual contact, an approach velocity of the selection device with respect to the virtual object at the point of virtual contact, and an approach acceleration of the selection device with respect to the virtual object at the point of virtual contact.

16. The system of claim 15, wherein, in determining whether the detected virtual contact corresponds to an intended or unintended virtual contact in the virtual environment based on the detected characteristic of the detected virtual contact, the processor is further configured to execute the instructions to cause the computing device to at least one of:
  compare the detected approach direction of the detected virtual contact to a preset approach direction range, and execute the command in the virtual environment if the detected approach direction of the detected virtual contact falls within the preset approach direction range;
  compare the detected approach velocity of the detected virtual contact to a preset approach velocity range, and execute the command in the virtual environment if the detected approach velocity of the detected virtual contact falls within the preset approach velocity range; or
  compare the detected approach acceleration of the detected virtual contact to a preset approach acceleration range, and execute the command in the virtual environment if the detected approach acceleration of the detected virtual contact falls within the preset approach acceleration range.

17. The system of claim 14, wherein the detected virtual contact is detected at a first surface of the virtual object, the first surface defining an actuation surface, the processor being further configured to execute the instructions to cause the computing device to:
  detect a subsequent virtual contact on a second surface of the virtual object, the second surface defining an inactive surface of the virtual object;
  determine that the subsequent virtual contact does not correspond to an intended virtual contact in the virtual environment; and
  ignore the detection of the subsequent virtual contact.

18. The system of claim 14, wherein, in detecting a virtual contact between a selection device and a virtual object of the plurality of virtual objects, the processor is further configured to execute the instructions to cause the computing device to:
  detecting that the virtual object is outside of a user field of view;
  determine that the detected virtual contact does not correspond to an intended virtual contact in the virtual environment; and
  ignore the detection of the virtual contact.

19. A method, comprising:
  generating a virtual environment for interacting, the virtual environment including displaying a plurality of virtual objects in the virtual environment;
  detecting a virtual contact between a selection device and a virtual object of the plurality of virtual objects, the detecting the virtual contact including tracking a position and an orientation of the selection device relative to the plurality of virtual objects;
  determining whether the detected virtual contact corresponds to an intended or unintended virtual contact in the virtual environment, the determining based on one or more of a characteristic of the detected virtual contact and an application context in the virtual environment at a time at which the virtual contact is detected, the determining including determining whether the detected virtual contact corresponds to a command to be executed based on the position and the orientation of the selection device at the time at which the virtual contact is detected; and
  when it is determined that the detected virtual contact corresponds to an intended virtual contact in the virtual environment;
    selecting the virtual object for actuation, and
    executing an action in the virtual environment corresponding to the selected virtual object and the command corresponding to the detected virtual contact, and
  when it is determined that the detected virtual contact corresponds to an unintended virtual contact in the virtual environment, ignoring the detection of the virtual contact.

20. A method, comprising:
  generating a virtual environment for interacting, the virtual environment including displaying a plurality of virtual objects in the virtual environment;
  detecting a characteristic of a virtual contact between a selection device and a virtual object of the plurality of virtual objects, the detecting the virtual contact including tracking a position and an orientation of the selection device relative to the plurality of virtual objects;
  determining whether the detected virtual contact corresponds to an intended or unintended virtual contact in the virtual environment, the determining being based on at least one of the characteristic of the detected virtual contact and a context associated with a particular scenario in the virtual environment at a time at which the virtual contact is detected, the determining including determining whether the detected virtual contact corresponds to a command to be executed based on the position and the orientation of the selection device at a time at which the virtual contact is detected; and
  when it is determined that the detected virtual contact corresponds to an intended virtual contact in the virtual environment;
    selecting the virtual object for actuation, and
    executing an action in the virtual environment corresponding to the selected virtual object and the command corresponding to the detected virtual contact, and
  when it is determined that the detected virtual contact corresponds to an unintended virtual contact in the virtual environment, ignoring the detection of the virtual contact.

* * * * *